United States Patent
Ku et al.

(10) Patent No.: US 8,531,319 B2
(45) Date of Patent: Sep. 10, 2013

(54) DISTINGUISHING INPUT SIGNALS DETECTED BY A MOBILE TERMINAL

(75) Inventors: Ja Hoon Ku, Seoul (KR); Jong Hwan Kim, Seoul (KR); Seon Hwi Cho, Seoul (KR)

(73) Assignee: LG Electronics Inc., Seoul (KR)

( * ) Notice: Subject to any disclaimer, the term of this patent is extended or adjusted under 35 U.S.C. 154(b) by 1171 days.

(21) Appl. No.: 12/430,876

(22) Filed: Apr. 27, 2009

(65) Prior Publication Data

US 2009/0322497 A1    Dec. 31, 2009

(30) Foreign Application Priority Data

Jun. 30, 2008  (KR) .................. 10-2008-0062800

(51) Int. Cl.
- *H04M 1/00*  (2006.01)
- *G06F 3/043*  (2006.01)
- *G08B 6/00*  (2006.01)

(52) U.S. Cl.
USPC ............. 341/20; 341/21; 341/23; 340/407.2; 345/177; 455/566

(58) Field of Classification Search
USPC ............ 341/20, 21, 23; 340/407.2; 345/177; 455/566
See application file for complete search history.

(56) References Cited

U.S. PATENT DOCUMENTS

| | | | | |
|---|---|---|---|---|
| 5,654,529 A | * | 8/1997 | Yeung et al. ............... | 178/19.03 |
| 6,963,762 B2 | * | 11/2005 | Kaaresoja et al. ............. | 455/567 |
| 7,446,456 B2 | * | 11/2008 | Maruyama et al. ........... | 310/328 |
| 2003/0122779 A1 | * | 7/2003 | Martin et al. .................. | 345/156 |
| 2003/0206162 A1 | * | 11/2003 | Roberts ........................ | 345/173 |
| 2006/0152497 A1 | * | 7/2006 | Rekimoto ..................... | 345/173 |
| 2007/0126705 A1 | * | 6/2007 | Ko et al. ........................ | 345/170 |
| 2008/0018604 A1 | * | 1/2008 | Paun et al. .................... | 345/168 |
| 2008/0018614 A1 | * | 1/2008 | Rekimoto ..................... | 345/173 |
| 2008/0024459 A1 | * | 1/2008 | Poupyrev et al. .............. | 345/173 |
| 2008/0164871 A1 | * | 7/2008 | Bailey et al. .............. | 324/207.25 |
| 2009/0088204 A1 | * | 4/2009 | Culbert et al. ............. | 455/556.1 |
| 2009/0091432 A1 | * | 4/2009 | Koser et al. ................ | 340/425.5 |
| 2009/0167509 A1 | * | 7/2009 | Fadell et al. ............... | 340/407.2 |
| 2009/0322498 A1 | * | 12/2009 | Yun et al. ................... | 340/407.2 |
| 2009/0325647 A1 | * | 12/2009 | Cho et al. ...................... | 455/567 |

FOREIGN PATENT DOCUMENTS

CN          1666169          9/2005

\* cited by examiner

*Primary Examiner* — Hai Phan

*Assistant Examiner* — Amine Benlagsir

(74) *Attorney, Agent, or Firm* — Lee, Hong, Degerman, Kang & Waimey

(57) ABSTRACT

A method of distinguishing input signals detected by a mobile terminal is provided. The method comprises detecting at least a first and a second input signal, wherein a first vibration signal is associated with the first input signal and a second vibration signal is associated with the second input signal; and outputting a combined vibration signal corresponding to at least the first and second input signals. The first and second input signals may be proximity signals, touch signals, or a combination thereof. The combined vibration signal may be outputted according to a characteristic of at least the first and second input signals.

40 Claims, 22 Drawing Sheets

FIG. 15
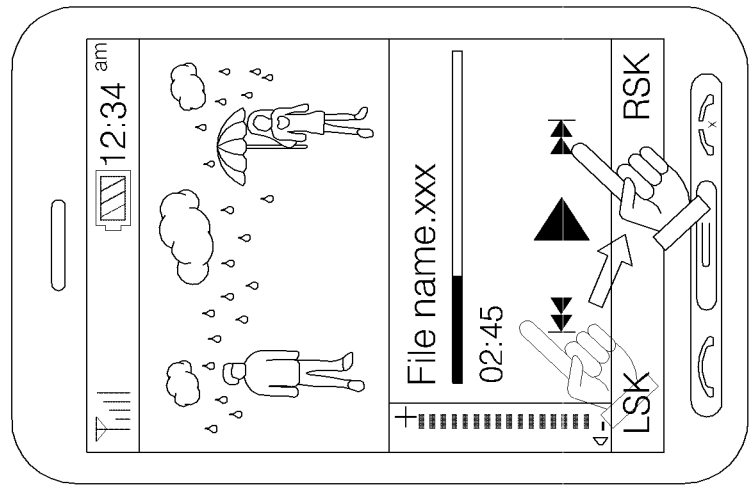
(a)
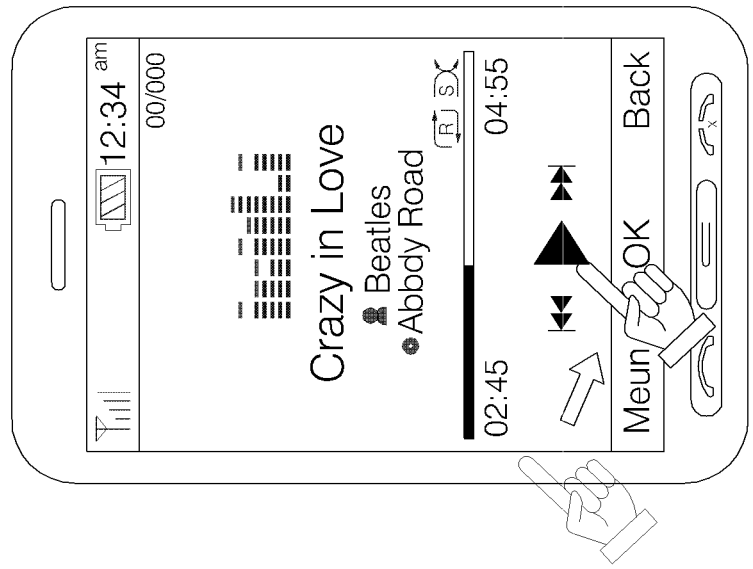
(b)

FIG. 16
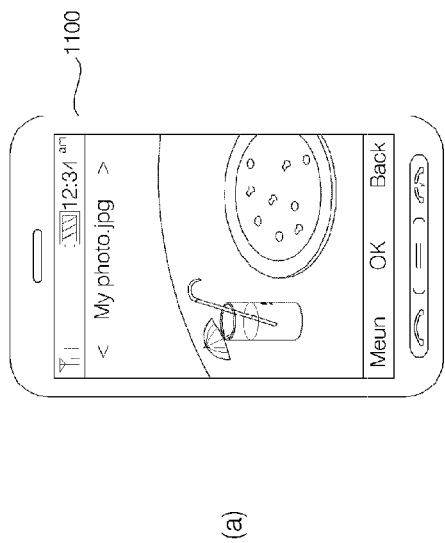
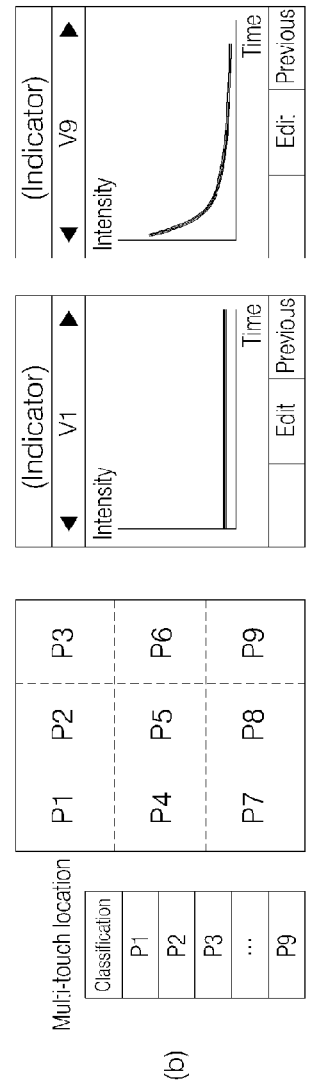

FIG.18
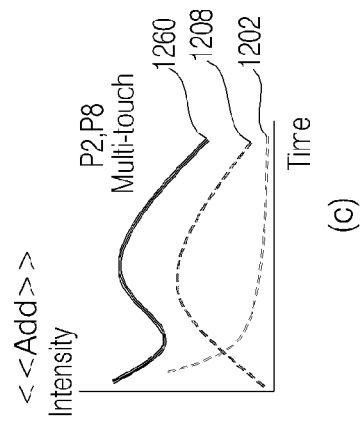
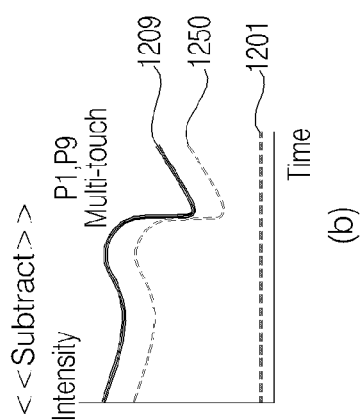
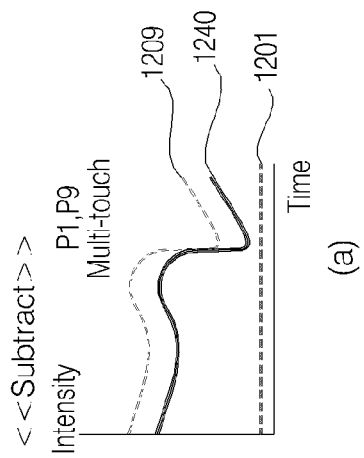
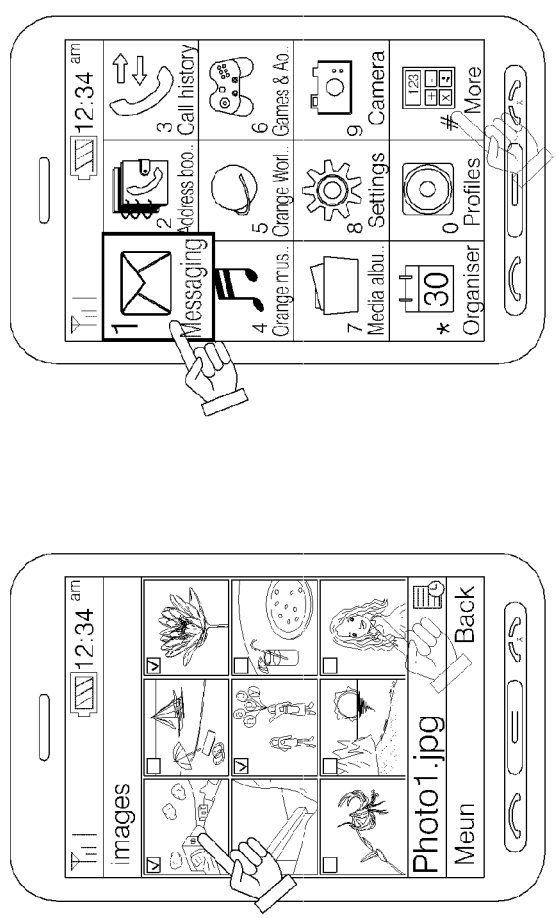

US 8,531,319 B2

DISTINGUISHING INPUT SIGNALS DETECTED BY A MOBILE TERMINAL

CROSS-REFERENCE TO RELATED APPLICATION

Pursuant to 35 U.S.C. §119, this application claims the benefit of earlier filing data and right of priority to Korean Application No. 10-2008-0062800, filed Jun. 30, 2008, the content of which is hereby incorporated by reference herein in its entirety.

TECHNICAL FIELD

The present invention relates generally to mobile terminals, and, more particularly, to distinguishing input signals detected by a mobile terminal.

BACKGROUND

A mobile terminal is a portable device capable of performing voice and video communication, inputting and outputting information, storing data, or other functions. In order to enable complex multimedia functions, a mobile terminal may be modified using hardware or software to output vibration signals, in addition to audio and video signals.

Usually, a mobile terminal outputs a vibration signal in response to receiving touch signal or a proximity signal. Unfortunately, there are a limited number of vibration signals, and the same vibration signal may be outputted for different types of touch signals and proximity signals.

Accordingly, systems and methods are needed to easily distinguish between different types of touch signals and proximity signals that are detected by a mobile terminal.

SUMMARY

The present disclosure is directed to systems and corresponding methods that facilitate detecting potential deadlocks across different test runs in an execution environment.

For purposes of summarizing, certain aspects, advantages, and novel features have been described herein. It is to be understood that not all such advantages may be achieved in accordance with any one particular embodiment. Thus, the claimed subject matter may be embodied or carried out in a manner that achieves or optimizes one advantage or group of advantages without achieving all advantages as may be taught or suggested herein.

In accordance with one embodiment, a method of distinguishing input signals detected by a mobile terminal is provided. The method comprises detecting at least a first and a second input signal, wherein a first vibration signal is associated with the first input signal and a second vibration signal is associated with the second input signal; and outputting a combined vibration signal corresponding to at least the first and second input signals. The first and second input signals may be proximity signals, touch signals, or a combination thereof. The combined vibration signal may be outputted according to type or characteristic of at least the first and second input signals.

In accordance with another embodiment, a method of distinguishing input signals detected by a mobile terminal is provided. The method comprises detecting a proximity signal and a touch signal inputted to the mobile terminal, wherein a first vibration signal is associated with the proximity signal and a second vibration is associated with the touch signal; determining a first location through which the proximity signal is inputted and a second location through which the touch signal is inputted; and outputting a combined vibration signal corresponding to the proximity signal and the touch signal, in response to determining that the first and second locations are the same.

In accordance with yet another embodiment, a method of distinguishing proximity signals detected by a proximity sensor of a mobile terminal is provided. The method comprises detecting a first proximity signal at a first proximity distance from the proximity sensor and a second proximity signal at a second proximity distance from the proximity sensor, wherein a first vibration signal is associated with the first proximity signal and a second vibration signal is associated with the second proximity signal; and outputting a combined vibration signal corresponding to the first and second proximity signals.

In accordance with yet another embodiment, method of distinguishing touch signals detected by a touch screen of a mobile terminal is provided. The method comprises detecting a first touch signal inputted at a first area of the touch screen and a second touch signal inputted at a second area of the touch screen, wherein a first vibration signal is associated with the first touch signal and a second vibration signal is associated with the second touch signal; and outputting a combined vibration signal corresponding to the first and second touch signals.

In accordance with yet another embodiment, a system comprising one or more logic units is provided. The one or more logic units are configured to perform the functions and operations associated with the above-disclosed methods.

In accordance with yet another embodiment, a computer program product comprising a computer useable medium having a computer readable program is provided. The computer readable program when executed on a computer causes the computer to perform the functions and operations associated with the above-disclosed methods.

One or more of the above-disclosed embodiments in addition to certain alternatives are provided in further detail below with reference to the attached figures. The invention is not, however, limited to any particular embodiment disclosed.

BRIEF DESCRIPTION OF THE DRAWINGS

Embodiments of the present invention are understood by referring to the figures in the attached drawings, as provided below.

FIGS. 14 and 15 are diagrams showing vibration signals outputted by the mobile terminal, in accordance with one or more embodiments.

FIGS. 16 to 18 are diagrams showing vibration signals outputted by the mobile terminal, in accordance with one or more embodiments.

Features, elements, and aspects of the invention that are referenced by the same numerals in different figures represent the same, equivalent, or similar features, elements, or aspects, in accordance with one or more embodiments.

DETAILED DESCRIPTION OF EXEMPLARY EMBODIMENTS

In the following, numerous specific details are set forth to provide a thorough description of various embodiments of the invention. Certain embodiments of the invention may be practiced without these specific details or with some variations in detail. In some instances, certain features are described in less detail so as not to obscure other aspects of the invention. The level of detail associated with each of the elements or features should not be construed to qualify the novelty or importance of one feature over the others.

As used herein, the terms "module," "unit," and "part" are used for purposes of facilitating disclosure. Therefore, significant meanings or roles should not be imputed to the terms themselves and it should be understood that the terms "module," "unit," and "part" may be used together or interchangeably.

Figure 1:
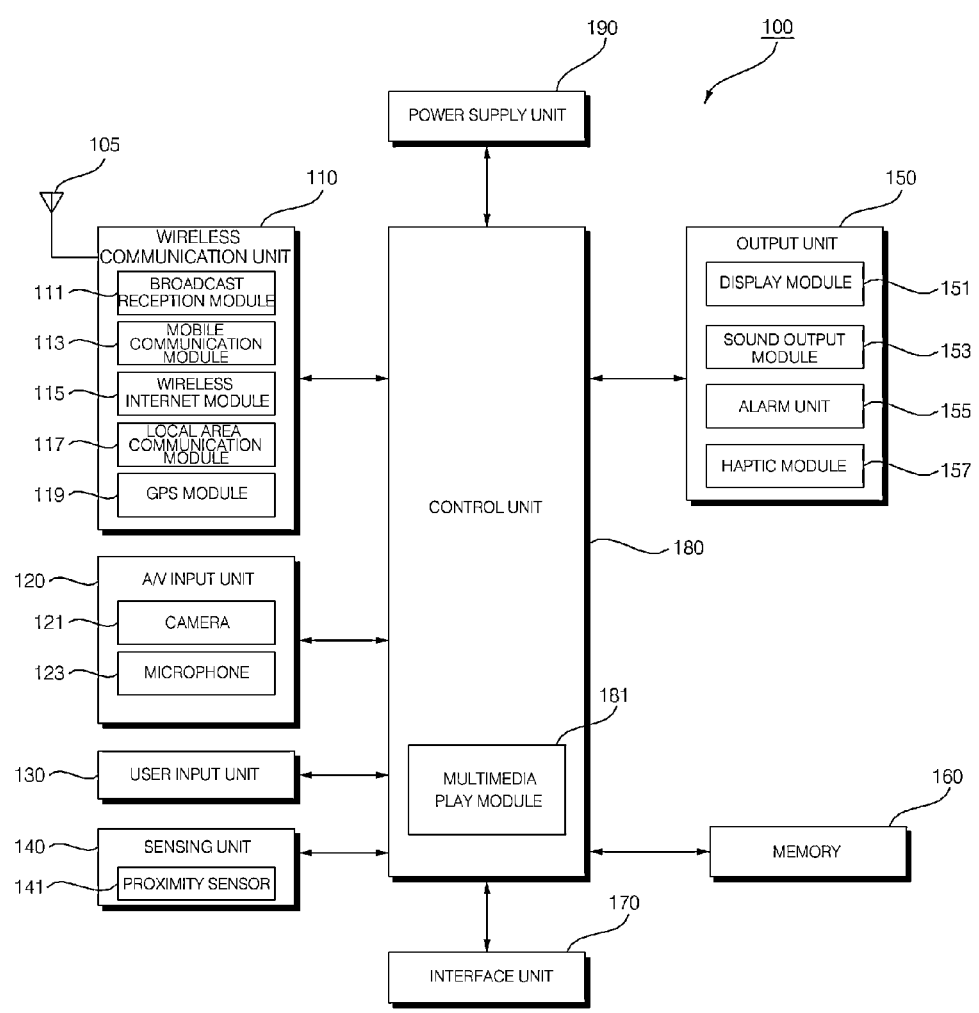
FIG. 1 is a block diagram of a mobile terminal, in accordance with one embodiment.

By way of non-limiting example only, the embodiments are described with reference to the mobile terminal 100 shown in FIG. 1. However, such teachings apply equally to mobile phones, smart phones, notebook computers, terminals for digital broadcasting, personal digital assistants (PDAs), portable multimedia players (PMPs), navigation devices for GPS, and other types of terminals. Also, FIG. 1 shows the mobile terminal 100 having various components, but it should be understood that implementing all of the illustrated components is not a requirement. Greater or fewer components may alternatively be implemented.

Referring to FIG. 1, a mobile terminal 100 may comprise a wireless communication unit 110, an audio/video (A/V) input unit 120, a user input unit 130, a sensing unit 140, an output unit 150, memory 160, an interface unit 170, a controller 180, and a power supply unit 190. When the constituent elements are implemented in actual applications, two or more of the constituent elements may be combined into one constituent element or one constituent element may be divided into two or more constituent elements, if appropriate.

The wireless communication unit 110 may comprise a broadcasting receiving module 111, a mobile communication module 113, a wireless Internet module 115, a local area communication module 117, a global positioning system (GPS) module 119, or other communication module.

The broadcasting receiving module 111 receives at least one of broadcasting signals and broadcasting-related information from an external broadcasting management server through broadcasting channels. The broadcasting channels can include a satellite channel, a terrestrial wave channel and the like. The broadcasting management server may refer to a server for creating and transmitting at least one of broadcasting signals and broadcasting-related information or a sever for receiving at least one of previously generated broadcasting signals and previously generated broadcasting-related information and transmitting it to a terminal.

The broadcasting-related information may refer to information pertinent to a broadcasting channel, a broadcasting program and/or a broadcasting service provider. The broadcasting signal may comprise not only TV broadcasting signals, radio broadcasting signals, and data broadcasting signals, but also broadcasting signals in which TV broadcasting signals or radio broadcasting signals are combined with data broadcasting signals. The broadcasting-related information may be provided over a mobile communication network. In this case, the broadcasting-related information can be received by the mobile communication module 113. The broadcasting-related information may exist in various forms. For example, the broadcasting-related information may exist in the form of the electronic program guide (EPG) of the digital multimedia broadcasting (DMB), the electronic service guide (ESG) of the digital video broadcast-handheld (DVB-H) or the like.

The broadcasting receiving module 111 receives broadcasting signals using various broadcasting systems. In particular, the broadcasting receiving module 111 can receive broadcasting signals using a digital broadcasting system, such as the digital multimedia broadcasting-terrestrial (DMB-T), the digital multimedia broadcasting-satellite (DMB-S), the media forward link only (MediaFLO), the digital video broadcast-handheld (DVB-H), and the integrated services digital broadcast-terrestrial (ISDB-T). The broadcasting receiving module 111 may be constructed to be suitable for not only the digital broadcasting systems, but also all broadcasting systems providing broadcasting signals. At least one of broadcasting signals and/or broadcasting-related information, received through the broadcasting receiving module 111, may be stored in the memory 160.

The mobile communication module 113 transmits and receives radio signals to and from at least one of a base station, an external terminal, and a server over a mobile communication network. Here, the radio signals may comprise voice call signals, video call signals, or various forms of data according to transmission/reception of text/multimedia messages.

The wireless Internet module 115 refers to a module for wireless Internet access. The wireless Internet module 115 may be built in the mobile terminal 100 or external to the mobile terminal 100. Wireless Internet technologies may employ wireless LAN (WLAN) (Wi-Fi), wireless broadband (Wibro), world interoperability for microwave access (Wimax), high-speed downlink packet access (HSDPA), and so on.

The local area communication module 117 refers to a module for local area communication. Local area communication technology can employ Bluetooth, radio frequency identification (RFID), infrared data association (IrDA), ultra wideband (UWB), ZigBee or the like. The GPS module 119 receives position information from a plurality of GPS satellites.

The A/V input unit 120 is adapted to input audio signals or video signals and can include a camera 121, a microphone 123, and so on. The camera 121 processes image frames, such as still images or motion images, which are captured by an image sensor in the video call mode or the capturing mode. The processed image frames may be displayed on a display unit 151.

The image frames processed by the camera 121 may be stored in the memory 160 or transmitted to the outside through the wireless communication unit 110. The camera 121 may be provided in plural numbers according to the configuration of a terminal.

The microphone 123 receives external sound signals in the call mode, the recording mode, the voice recognition mode, etc. and converts the received sound signals into electrical voice data. In the call mode, the processed voice data may be converted into a format, which can be transmitted to a mobile communication base station through the mobile communication module 113, and then output. The microphone 123 may employ a variety of noise removal algorithms for removing noise occurring in the process of receiving external sound signals.

The user input unit 130 generates key entry data, which is input by a user in order to control the operation of the terminal. The user input unit 130 may comprise the keypad, the dome switch, the touch pad (static pressure/constant electricity), the jog wheel, the jog switch, the finger mouse or the like. In particular, a mutually layered structure of the touch pad and the display unit 151, which will be described later on, may be referred to as a touch screen.

The sensing unit 140 senses a current status of the mobile terminal 100, such as a closed state of the mobile terminal 100, the position of the mobile terminal 100, whether a user touches the mobile terminal 100 or not, and so on and generates a sensing signal for controlling the operation of the mobile terminal 100. For example, when the mobile terminal 100 is a slide phone type, the sensing unit 140 can sense whether the slide phone is opened or not. The sensing unit 140 may also have the functions of sensing whether the power supply unit 190 supplies power or not, whether the interface unit 170 is connected to an external device, and so on.

The sensing unit 140 can include a proximity sensor 141. The proximity sensor 141 may detect an approaching object, whether objects exist nearby, etc. without mechanical contact. The proximity sensor 141 may detect neighboring objects by employing a change of AC magnetic field, a change of static magnetic field, the rate of capacitance or the like. Two or more proximity sensors 141 may be used according to the aspect of a configuration.

The output unit 150 is constructed to output audio signals, video signals or alarm signals and may comprise the display unit 151, a sound output module 153, an alarm unit 155, a haptic module 157, and so on.

The display unit 151 displays information processed in the mobile terminal 100. For example, when the mobile terminal is in the call mode, the display unit 151 displays a user interface (UI) or a graphic user interface (GUI), which is pertinent to a call. When the mobile terminal 100 is in the video call mode or the capturing mode, the display unit 151 displays captured or received images individually or simultaneously and also displays a UI or a GUI.

Meanwhile, in the case in which the display unit 151 and the touch pad form the mutually layered structure and construct a touch screen as described above, the display unit 151 may also be used as an input device as well as the output device. If the display unit 151 comprises a touch screen, the display unit 151 may also comprise a touch screen panel, a touch screen panel controller, or other touch screen component. In one embodiment, the touch screen panel is a transparent panel attached to the outside and may be connected to an internal bus within the mobile terminal 100. The touch screen panel continues to monitor whether there is a touch input and, when there is a touch input, sends corresponding signals to the touch screen panel controller. The touch screen panel controller processes the corresponding signals received from the touch screen panel and transmits the corresponding data to the controller 180, so that the controller 180 may determined whether there has been a touch input or which area of the touch screen has been touched.

The display unit 151 may comprise at least one of a liquid crystal display, a thin film transistor-liquid crystal display, an organic light-emitting diode, a flexible display, and a 3D display. Two or more display units 151 may exist according to the implementation type of the mobile terminal 100. For example, the mobile terminal 100 may be equipped with both an external display unit (not shown) and an internal display unit (not shown).

The sound output module 153 outputs audio data, which is received from the wireless communication unit 110 in the incoming call mode, the call mode, the record mode, the voice recognition mode, the incoming broadcasting mode or the like or stored in the memory 160. The sound output module 153 also outputs sound signals pertinent to the functions performed in the mobile terminal 100, for example, sound of a received call signal and sound of a received message. The sound output module 153 can include a speaker, a buzzer or the like.

The alarm unit 155 outputs signals to inform the occurrence of events in the mobile terminal 100. For example, the events occurring in the mobile terminal 100 may comprise an incoming call signal, a received message, an entered key signal input and so on. The alarm unit 155 may also output signals to inform the occurrence of events in different ways other than the audio or video signals. For example, the alarm unit 155 can output the signals in vibration form.

When a call signal is received or a message is received, the alarm unit 155 may generate a signal in order to inform the reception of the call signal or message. Alternatively, when a key signal is input, the alarm unit 155 may generate a signal as a feedback to the input key signal. A user may notice the occurrence of an event through the output of the signal. It should be understood that signals, informing the occurrence of events, from the mobile terminal 100 may also be output through the display unit 151 or the sound output module 153.

The haptic module 157 generates a variety of haptic effects which may be felt by a user. A representative example of the haptic effects, which are generated by the haptic module 157, is a vibration signal. When the haptic module 157 generates a vibration signal, the intensity, pattern, or other characteristic of the vibration signal generated by the haptic module 157 may be converted, and different pieces of vibration signals may be composed or output or sequentially output.

The haptic module 157 may generate various haptic effects, such as an effect caused by a stimulus of the arrangement of pins, which move vertically to a contact skin surface, an effect caused by a stimulus through spraying force or suction force by the air through an injection nozzle or an inlet, an effect caused by a stimulus passing over the skin surface, an effect caused by a stimulus through the contact of an electrode, an effect caused by a stimulus employing electrostatic force, and an effect caused by the reappearance of a feeling of cold and warmth employing an element that may absorb or generate heat, as well as a vibration signal.

The haptic module 157 may be implemented to not only transfer the haptic effects through a direct contact, but also make the haptic effects felt through myasthenia such as a user's finger, arm, etc. In one embodiment, the mobile terminal 100 may comprise a plurality of haptic modules 157. The memory 160 may store programs necessary to process and control the controller 180 and also function to temporarily store input or output data (for example, a phonebook, messages, still images, motion images and the like).

The memory 160 may comprise at least one type of storage media, including a flash memory type, a hard disk type, a multimedia card micro type, card type memory (for example, SD memory, XD memory, and so on), RAM, and ROM. The mobile terminal 100 may also manage a web storage serving as the storage function of the memory 160 on an Internet.

The interface unit 170 functions as an interface with all external devices connected to the mobile terminal 100. Examples of the external devices connected to the mobile terminal 100 can include a wired/wireless headset, an external charger, wired/wireless data ports, a memory card, a card socket such as subscriber identification module (SIM)/user identity module (UIM) cards, an audio input/output (I/O) terminal, a video I/O terminal, an earphone, and so on. The interface unit 170 can receive data or can be supplied with power from the external devices, transfer the data or power to respective constituent elements of the mobile terminal 100, and transmit data of the mobile terminal 100 to the external devices.

The interface unit 170 may become a passage in which power source from external cradles is supplied to the mobile terminal 100 when the mobile terminal 100 is coupled to the cradles or a passage in which a variety of command signals input from cradles by a user are transferred to the mobile terminal 100.

The controller 180 typically controls the operation of each of the elements and controls an overall operation of the mobile terminal 100. For example, the controller 180 may perform pertinent controls and processes for voice call, data communication, video telephony, and so on. The controller 180 may comprise a multimedia play module 181 for playing multimedia. The multimedia play module 181 may be constructed in hardware within the controller 180 or constructed in software separately from the controller 180.

The power supply unit 190 is supplied with external power source or internal power source and supplies power source necessary for the operation of the each constituent element under the control of the controller 180. The mobile terminal 100 may be configured to be operable in a communication system, which transmits data through frames or packets, including a wired/wireless communication system and a satellite-based communication system.

The mobile terminal pertinent to the present invention has been described so far from a viewpoint of the constituent elements according to its functions. Hereinafter, the mobile terminal pertinent to the present invention is further described from a viewpoint of the constituent elements according to its external shape with reference to FIGS. 2 and 3. Hereinafter, of several types of mobile terminals such as the folding type, the bar type, the swing type, and the sliding type, a sliding type mobile terminal equipped with a touch screen is described as an example, for convenience of description. However, it should be understood that the present invention is not limited to the sliding type mobile terminal, but instead may be applied to all types of mobile terminals, including the above types.

Figure 2:
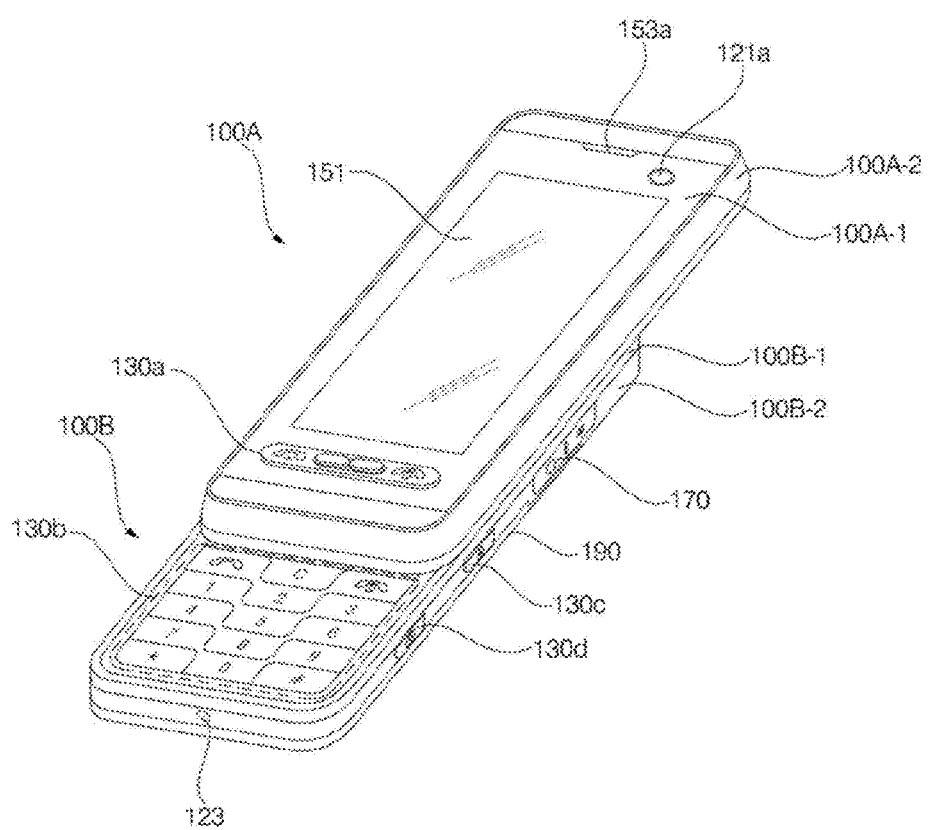
FIG. 2 is a front perspective view of a mobile terminal, in accordance with one embodiment.

FIG. 2 is a front perspective view of the mobile terminal 100, in accordance with an embodiment. Referring to FIG. 2, the mobile terminal 100 comprises a first body 100A, and a second body 100B configured to slide in at least one direction in the first body 100A.

A state where the first body 100A is overlapped with the second body 100B can be called a closed configuration, and a state where at least part of the second body 100B is exposed through the first body 100A, as shown in FIG. 2, may be called an open configuration.

In the closed configuration of the mobile terminal 100, the mobile terminal 100 generally operates in a standby mode, but the standby mode may be released by user interaction with the mobile terminal 100. In the open configuration of the mobile terminal 100, the mobile terminal 100 generally operates in a call mode, etc., but the call mode may be switched to the standby mode through user interaction with the mobile terminal 100 or after a lapse of a certain time period.

A casing constituting an external shape of the first body 100A is comprised of a first front casing 100A-1 and a first rear casing 100A-2. A variety of electronic components are embedded in space formed by the first front casing 100A-1 and the first rear casing 100A-2. At least one middle casing can be further disposed between the first front casing 100A-1 and the first rear casing 100A-2. The casings may be formed by injecting synthetic resin or can be formed from metal, such as stainless steel (STS) or titanium (Ti).

The display unit 151, a first sound output module 153a, a first camera 121a, and a first user input unit 130 may be further disposed in the first body 100A, more particularly, the first front casing 100A-1.

The display unit 151 includes a liquid crystal display (LCD), an organic light emitting diode (OLED) and the like, which visually display information. A touch pad may be overlapped with the display unit 151 in a layered structure and, therefore, the display unit 151 operates as a touch screen, enabling the input of information by a user's touch. The first sound output module 153a may be implemented in the form of a receiver or speaker. The first camera 121a may be implemented appropriately to capture still images or motion images of a user, etc.

In the same manner as the first body 100A, a casing, constituting an external appearance of the second body 100B, is constituted by a second front casing 100B-1 and a second rear casing 100B-2. A second user input unit 130b may be disposed on the front face of the second body 100B, more particularly, the second front casing 100B-1. Third and fourth user input units 130c and 130d, the microphone 123, and the interface unit 170 may be disposed in at least one of the second front casing 100B-1 and the second rear casing 100B-2.

The first to fourth user input units 130a, 130b, 130c, and 130d may be collectively called the user input unit 130 and may adopt any kind of a method as long as it is a tactile manner, which allows a user to manipulate the user input unit 130 while feeling a tactile sense.

For example, the user input unit 130 may be implemented using a dome switch or a touch pad, which is able to receive commands or information through a user's push or touch manipulation, or may be implemented using a wheel or jog method of rotating a key or a method using a joystick.

From a viewpoint of the function, the first user input unit 130a is adapted to input commands such as start, end, and scrolling. The second user input unit 130b is adapted to input numbers, text, symbols and so on. Further, the third and fourth user input units 130c and 130d may operate as hot keys for activating special functions within the mobile terminal 100.

The microphone 123 may be implemented in an adequate fashion, which is appropriate to receive a user's voice, other sound and so on. The interface unit 170 becomes a passage through which the mobile terminal according to the present invention may exchange data, etc. with external devices. For example, the interface unit 170 may be at least one of a connector for connecting to an earphone in a wired or wireless manner, a port for local area communication, and a power supply terminal for supplying power source to the mobile terminal 100. The interface unit 170 may be a card socket for accommodating external cards, such as a subscriber identification module (SIM), a user identity module (UIM), and a memory card for information storage.

The power supply unit 190 for supplying power source to the mobile terminal is disposed on the part of the second rear casing 100B-2. The power supply unit 190 may be, for example, a rechargeable battery, and may be detachably attached to the second body 100B for recharging, and so on.

Figure 3:
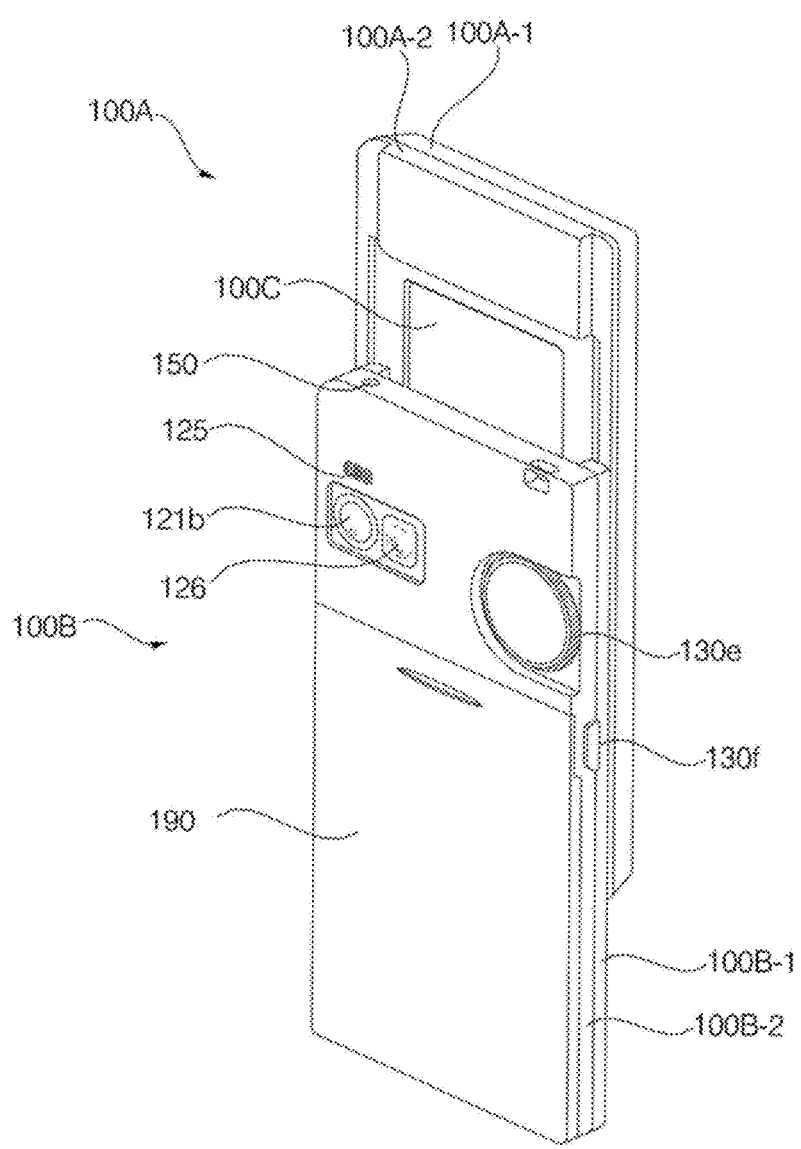
FIG. 3 is a rear perspective view of a mobile terminal, in accordance with one embodiment.

FIG. 3 is a rear perspective view of the mobile terminal 100, in accordance with one embodiment. Referring to FIG. 3, a fifth user input unit 130e of a wheel type and a second camera 121b may be further disposed on the rear face of the second rear casing 100B-2 of the second body 100B. A sixth user input unit 130f may be arranged on the side of the second body 100B.

The second camera 121b has a photographing direction substantially opposite to that of the first camera 121a and may have different pixels from that of the first camera 121a. For example, the first camera 121a may have low pixels sufficiently enough to capture an image of a user's face and transmit the captured image to a counterpart in a video call or the like. The second camera 121b may have high pixels since general subjects are photographed and are not generally transmitted immediately.

A flash 125 and a mirror 126 may be further disposed adjacent to the second camera 121b. The flash 125 illuminates light to a subject when the subject is photographed by the second camera 121b. The mirror 126 reflects a user's face, etc. when the user tries to have his picture taken (self-photographing) using the second camera 121b.

A second sound output module (not shown) may be further disposed in the second rear casing 100B-2. The second sound output module may implement a stereo function together with the first sound output module 153a and may also be used for a call in a speakerphone mode.

An antenna (not shown) for receiving broadcasting signals as well as an antenna for a call, etc., may be disposed on one side of the second rear casing 100B-2. The antenna may be drawn out from the second body 100B. A part of a sliding module 100C, which slidingly couples the first body 100A and the second body 100B, may be disposed on the part of the first rear casing 100A-2 of the first body 100A. The other part of the sliding module 100C may be disposed on the part of the second front casing 100B-1 of the second body 100B and may not be exposed to the outside, as shown in FIG. 3.

It has been described above that the second camera module 121b, and so on are disposed in the second body 100B, but the present invention is not necessarily limited to the above arrangement. For example, at least one of the constituent elements, which are described to be arranged in the second rear casing 100B-2, such as the second camera module 121b, may be disposed in the first body 100A, mainly, in the first rear casing 100A-2.

In this configuration, the closed configuration has an advantage in that the constituent elements arranged in the first rear casing 100A-2 are protected by the second body 100B. Further, although the second camera module 121b is not separately included, the first camera module 121a may be rotatably disposed in such a way as to photograph even photographing directions of the second camera module 121b.

The power supply unit 190 for supplying power source to the mobile terminal is mounted on the part of the rear casing 100A-2. The power supply unit 190 may be, for example, a rechargeable battery and may be detachably coupled to the rear casing 100A-2 for charging, and so on.

Figure 4:
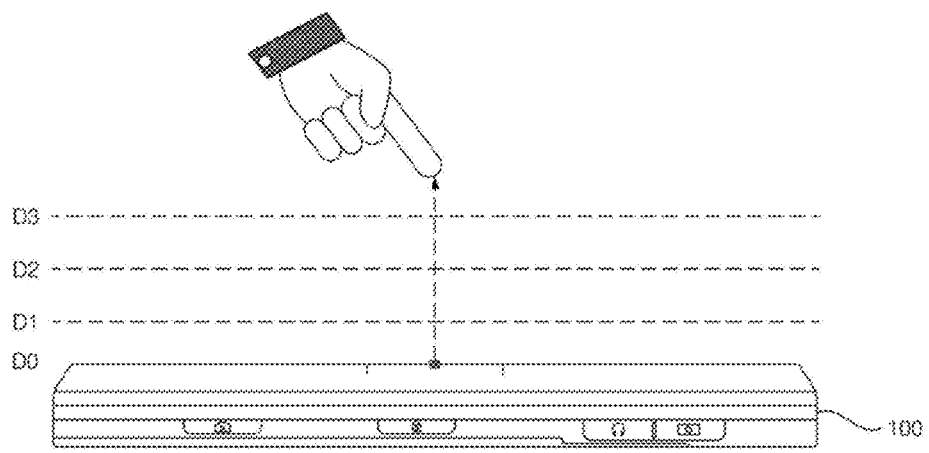
FIG. 4 illustrates operation of a proximity sensor, in accordance with one embodiment.

FIG. 4 illustrates operation of a proximity sensor 141, in accordance with one embodiment. As shown in FIG. 4, when a user's finger approaches the display unit 151, the proximity sensor 141 senses such approach and outputs a proximity signal. In one embodiment, the proximity sensor 141 may output different proximity signals when the user's finger is placed at a location D3 and when the user's finger is located at a location D2 or D1.

In other words, assuming that a distance in which the proximity sensor approaches a detection object and outputs a proximity signal is a detection distance Sn, if proximity signals output from a plurality of the proximity sensors having different detection distances are compared with each other, it may be known how near the object approaches the proximity sensors 141.

Further, if a plurality of proximity sensors 141 having different detection areas is disposed and which proximity signal is output from which one of the proximity sensors 141 is understood, it may be known that a detection object approaches which area of the display unit 151, whether a detection object moves close to the display unit 151, and so on. Accordingly, the controller 180 may perform a variety of operation controls according to a degree in which a user's finger, etc. approaches the display unit 151, a proximity location thereof, and so on.

Figure 5A:
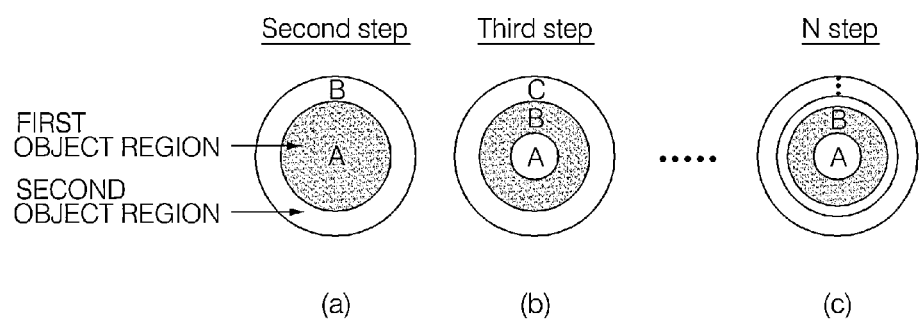
FIGS. 5a and 5b illustrate a proximity area and a haptic area, in accordance with one embodiment.
Figure 5B:
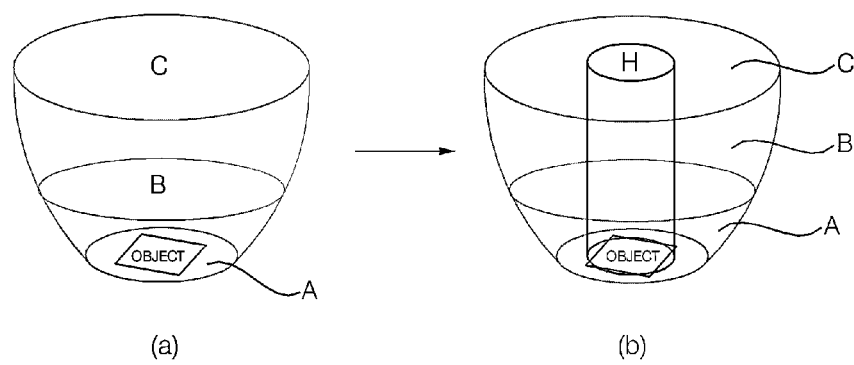

FIGS. 5a and 5b are diagrams illustrating a proximity area in which the proximity sensor outputs a proximity signal and a haptic area in which a haptic effect is generated. In the case in which an object, such as an icon or menu item as shown in (a) of FIG. 5a, is displayed in the display unit 151, an area in which the object is displayed may be divided into a first area A at the center of the display unit 151 and a second area B adjacent to the boundary of the display unit 151, and haptic effects with different intensity and patterns may be generated from the first area A and the second area B. For example, the proximity sensor may be configured to output a vibration signal when the first area A is touched rather than when the second area B is touched.

In the case in which a proximity signal is used together with a haptic effect, a haptic area from which the haptic effect is generated and a proximity area in which the proximity signal is sensed may be defined differently. In other words, the haptic area may be set to be narrower than the proximity area, or the haptic area may be set to be wider than the proximity area. For example, in (a) of FIG. 5a, an area, including the first area A and the second area B, may be defined as the proximity area, and the first area A may be defined as the haptic area.

Further, an area in which an object is displayed may be divided into three areas A, B, and C as shown in (b) of FIG. 5a and may be divided into n areas as shown in (c) of FIG. 5a such that haptic effects with different intensity and patterns may be generated from the respective areas. Even in the case in which the area is divided as described above, the proximity area and the haptic area may be defined differently.

The size of the proximity area may be constructed to vary according to a degree in which an object approaches the display unit 151. In other words, as shown in (a) of FIG. 5b, the size of the proximity area may be constructed to gradually decrease in order of C, B, and A or gradually increase in order of A, B, and C according to a degree in which an object approaches the display unit 151. Even in this case, as in an area 'H' shown in (b) of FIG. 5b, a haptic area from which a haptic effect has been generated may be constructed to have a constant size irrespective of a degree in which an object approaches the display unit 151.

Figure 6:
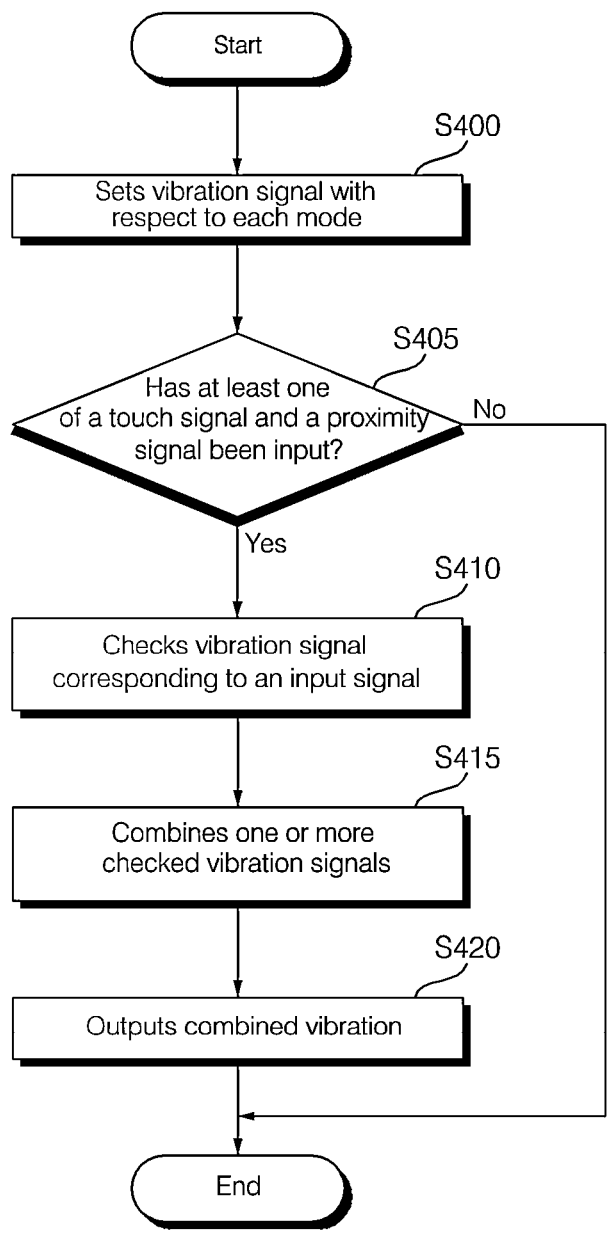
FIG. 6 is a flowchart illustrating a method of distinguishing input signals detected by the mobile terminal, in accordance with one embodiment.

FIG. 6 is a flowchart illustrating a method of distinguishing signals received by the mobile terminal 100, in accordance with one embodiment.

As shown in FIG. 6, the controller 180 assigns vibration signals to touch signals and proximity signals (S400). The vibration signals may be automatically assigned by the controller 180 or may be generated by a user. In one embodiment, a first vibration signal may be assigned to touch signals and a second vibration signal may be assigned to proximity signals. In another embodiment, vibration signals may be assigned according to characteristics of touch signals and proximity signals.

For example, different vibration signals may be assigned to touch signals input within a certain area, touch signals input with a specific pressure, and touch signals input through multiple points. Further, different vibration signals may be assigned to proximity signals input within a certain area, proximity signals input within a certain distance, proximity signals input at a certain speed, and proximity signals input at multiple points.

Next, the controller 180 determines whether at least one of a touch signal and a proximity signal has been input (S405). For example, one or more touch signals may be inputted, one or more proximity signals may be inputted, or one or more proximity signals and touch signals may be inputted simultaneously. Touch signals may be determined based on values detected in a touch screen, and proximity signals may be determined based on values detected by the proximity sensor 141. If, as a result of the determination in S405, at least a touch signal or a proximity signal has not been inputted, the controller 180 does not output a vibration signal.

On the other hand, if, as a result of the determination in step S405, at least one of a touch signal and a proximity signal has been inputted, the controller 180 analyzes the inputted signal and looks up the vibration signal assigned to the input signal (S410). If there is more than one inputted signal, the controller 180 combines the vibration signals assigned to the inputted signals (S415).

The controller 180 may combine one or more vibration signals through addition and subtraction. The combination method of the vibration signals may be automatically defined by the controller 180 according to an analyzed signal, or a user may select the combination method. Next, the controller 180 outputs the combined vibration signals through the haptic module 157 (S420).

Figure 7:
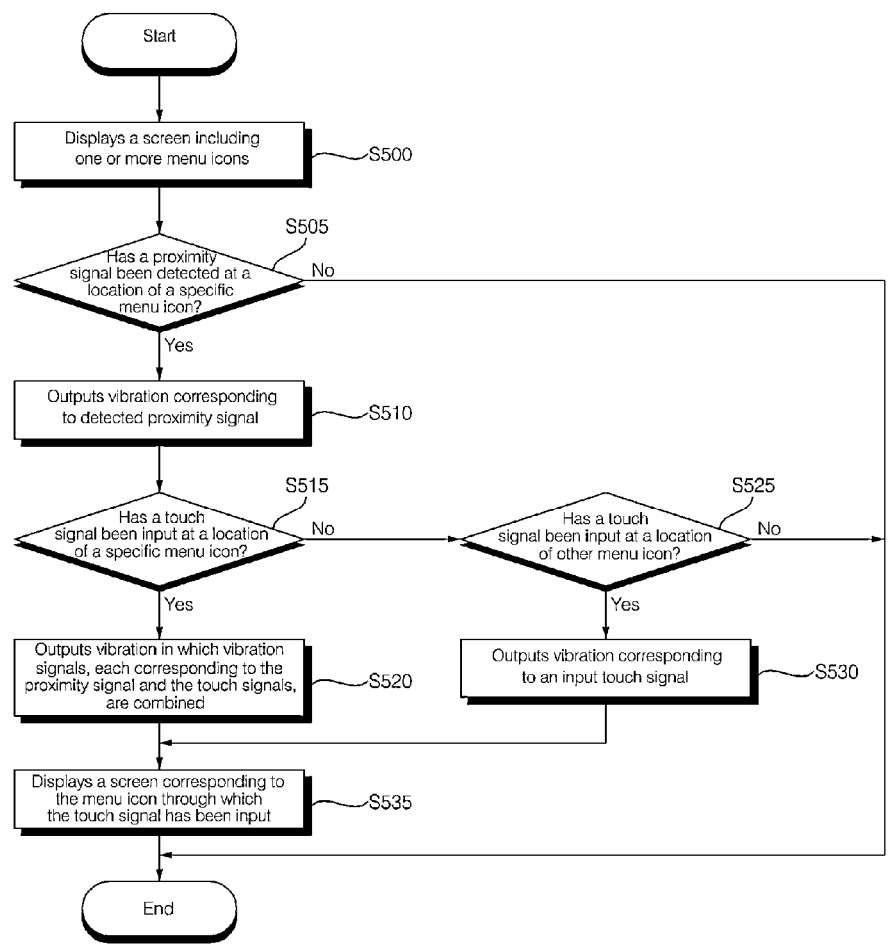
FIG. 7 is a flowchart illustrating a method of distinguishing input signals inputted from different display locations, in accordance with one embodiment.

FIG. 7 is a flowchart illustrating a method of distinguishing input signals associated with different display locations, in accordance with one embodiment.

As shown in FIG. 7, a screen, including one or more menu icons, is displayed on the display unit 151 (S500). The menu icon may be a menu icon that may be selected to enter a down menu, an icon for performing a specific function or one or more images.

Next, the controller 180 determines whether a proximity signal has been detected at the location of a specific one of the one or more menu icons through the proximity sensor 141 (S505). If, as a result of the determination in S505, the proximity signal has not been detected at the location of a specific menu icon, the controller 180 does not output a vibration signal. On the other hand, if, as a result of the determination in S505, the proximity signal has been detected at the location of a specific menu icon, the controller 180 outputs a vibration signal, corresponding to the detected proximity signal, through the haptic module 157 (S510). Here, a single vibration signal corresponding to the detected proximity signal is output as vibration. Next, the controller determines whether a touch signal has been input through the specific menu icon of the location where the proximity signal was detected in step S505 (S515). Here, the touch signal may be input through a touch screen.

If, as a result of the determination in S515, the touch signal has not been input through the specific menu icon, the controller 180 determines whether the touch signal has been input through a menu icon different from the specific menu icon (S525). If, as a result of the determination in S525, the touch signal has not been input through the different menu icon, the controller 180 does not output a vibration signal.

Meanwhile, if, as a result of the determination in step S525, the touch signal has been input through the different menu icon, the controller 180 outputs a vibration signal, corresponding to the input touch signal, through the haptic module 157 (S530). Next, the controller 180 displays a screen, corresponding to the menu icon through which the touch signal has been input, on the display unit 151 (S535).

On the other hand, if, as a result of the determination in S515, the touch signal has been input through the specific menu icon, the controller 180 outputs vibration in which a vibration signal corresponding to the proximity signal, which has been detected in step S505, and a vibration signal corresponding to the touch signal, which has been input in step S515, are combined through the haptic module 157 (S520). The respective vibration signals may be added or subtracted and then output as vibration. The controller 180 then displays a screen corresponding to the menu icon through which the touch signal has been input on the display unit 151 (S535).

Figure 8:
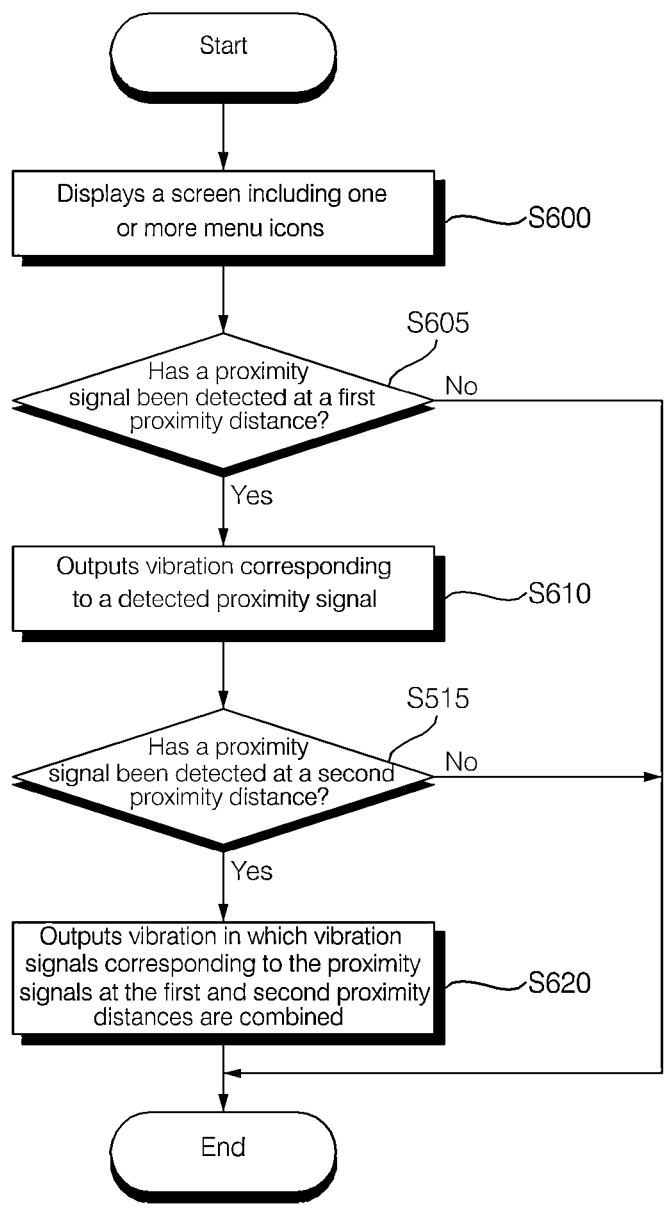
FIG. 8 is a flowchart illustrating a method of distinguishing input signals inputted from different distances from a proximity sensor, in accordance with one embodiment.

FIG. 8 is a flowchart illustrating a method of distinguishing input signals associated with different distances from the proximity sensor 141, in accordance with one embodiment. As shown in FIG. 8, the controller 180 displays a screen, including one or more menu icons, on the display unit 151 (S600).

The controller 180 determines whether a proximity signal whose distance from the proximity sensor 141 is a first proximity distance has been detected through the proximity sensor 141 (S605). If, as a result of the determination in S605, the proximity signal having the first proximity distance has not been detected, the controller 180 does not output a vibration signal.

On the other hand, if, as a result of the determination in S605, the proximity signal having the first proximity distance has been detected, the controller 180 outputs a vibration signal, corresponding to the detected proximity signal having the first proximity distance, through the haptic module 157 (S610). Next, the controller 180 determines whether a proximity signal whose distance from the proximity sensor 141 is a second proximity distance has been detected (S615). If, as a result of the determination in S615, the proximity signal having the second proximity distance has not been detected, the controller 180 does not output a vibration signal.

On the other hand, if, as a result of the determination in S615, the proximity signal having the second proximity distance has been detected, the controller 180 outputs vibration in which a vibration signal, corresponding to the proximity signal of the first proximity distance, which has been detected in S605, and a vibration signal corresponding to the proximity signal of the second proximity distance, which has been detected in S615, are combined through the haptic module 157.

Figure 9:
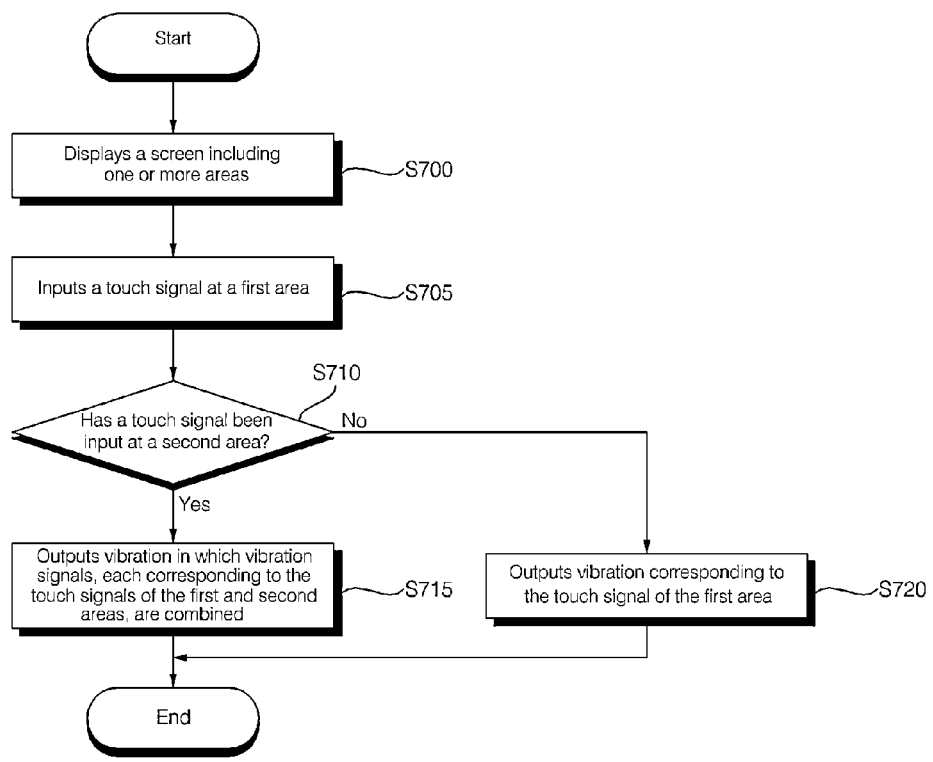
FIG. 9 is a flowchart illustrating a method of distinguishing input signals inputted from different display areas, in accordance with one embodiment.

FIG. 9 is a flowchart illustrating a method of distinguishing input signals associated with different display areas, in accordance with one embodiment. As shown in FIG. 9, the controller 180 displays a screen, including one or more areas, on the display unit 151 (S700). Each of the one or more areas may comprise of an image, a document, a keypad or a menu icon. The areas may be set by a user, and the screen may be divided equally and then designated as specific areas. As a touch signal or a proximity signal is input through two or more areas, vibration may be output through multi-touch.

A touch signal is input through a first area (S705). Here, a signal input through the first area and a second area may be not only a touch signal, but also a proximity signal detected through the proximity sensor 141.

Next, the controller 180 determines whether a touch signal has been input through the second area (S710). If, as a result of the determination in step S710, the touch signal has not input through the second area, the controller 180 outputs a vibration signal, corresponding to the touch signal of the first area, through the haptic module 157. A touch signal input through the first area and a touch signal input through the second area may be performed at the same time.

On the other hand, if, as a result of the determination in S710, the touch signal has input through the second area, the controller 180 outputs vibration in which a vibration signal corresponding to the touch signal of the first area and a vibration signal corresponding to the touch signal of the second area are combined through the haptic module 157.

The combined vibration signal may be output differently depending on a method in which a touch signal is input through the first area and a touch signal is input through the second area. For example, the combined vibration signal may be output differently according to a distance between the first area and the second area. When a distance between the first area and the second area is less than a specific distance, vibration may be output by subtracting respective vibration signals. When a distance between the first area and the second area is larger than a specific distance, vibration in which respective vibration signals are summed may be output.

Further, in the case in which a distance between areas in which respective touch signals are input is changed in real time, vibration may be output differently according to the changed distance. For example, in the case in which, after touch signals are input through a first area and a second area, touch signals are input through a third area and a fourth area, it is assumed that the first area and the third area are entered using the same finger and the second area and the fourth area are entered using the same finger.

It corresponds to a case where multi-touch with different distances is repeatedly generated using a thumb and a index finger. This is because a case where multi-touch is entered using two fingers is general. At this time, in the case in which a distance between the third area and the fourth area becomes wider than a distance between the first area and the second area, a last vibration signal in which first vibration, wherein a vibration signal corresponding to a touch signal in the first area and a vibration signal corresponding to a touch signal in the second area are combined, and second vibration.

In one embodiment, a vibration signal corresponding to a touch signal in the third area and a vibration signal corresponding to a touch signal in the fourth area are combined, have been added may be output. In the case in which a distance between the third area and the fourth area becomes narrower than a distance between the first area and the second area, a last vibration signal in which the first vibration has been subtracted from the second vibration may be output.

As another embodiment, vibration may be output differently according to a speed in which a distance between areas through which respective touch signals are input is changed. In the case in which, after touch signals are input through a first area and a second area, touch signals are input through a third area and a fourth area, it is assumed that the first area and the third area are entered using the same finger and the second area and the fourth area are entered using the same finger. In other words, it corresponds to a case where multi-touch with different speeds is repeatedly generated using a thumb and a index finger.

The speed is calculated in relation to the time and distance from where the touch signals are input through the first area and the second area to where the touch signals are input through the third area and the fourth area. When the speed is greater than a specific speed, a vibration signal corresponding to the touch signal in the first area and a vibration signal corresponding to the touch signal in the second area are combined.

In some embodiments, a vibration signal corresponding to the touch signal in the third area and a vibration signal corresponding to the touch signal in the fourth area are combined, and outputted. When the speed is lower than a specific speed, a last vibration signal in which the first vibration has been subtracted from the second vibration may be output.

As still another embodiment, in the case in which a distance between respective touch signals, which may be input through a touch screen, becomes a maximum, it is necessary to inform information about the distance. Here, a maximum distance of the each touch signal may be identical to or shorter than a maximum straight-line distance in which a touch signal may be input in a touch screen.

For example, in the case in which an image is enlarged by each input touch signal and then displayed as a maximum size that may be displayed on the display unit 151, information, indicating that further enlargement of the image is difficult, should be known. Accordingly, first alarm vibration other than vibration in which vibration signals corresponding to touch signals are combined in respective areas may be further output, and vibration in which vibration signals corresponding to touch signals are combined in respective areas may not be output, but only first alarm vibration may be output.

Further, in the case in which a distance between respective touch signals, which may be input through a touch screen, becomes a minimum, it is necessary to inform information about the distance. Here, a minimum distance of the each touch signal may be identical to or longer than a minimum straight-line distance in which a touch signal may be input in a touch screen.

For example, in the case in which an image is reduced by each input touch signal and then displayed as a minimum size that may be displayed on the display unit 151, information, indicating that further reduction of the image is difficult, should be known. Accordingly, second alarm vibration other than vibration in which vibration signals corresponding to touch signals are combined in respective areas may be further output.

Touch signals used in the multi-touch may be applicable to proximity signals detected by the proximity sensor. That is, even in the event of a distance difference between areas in which the proximity signals are detected, a distance change of an area, and a speed change, the various vibration patterns may be output.

The controller 180 may display an execution screen of a menu icon displayed in a first area on the display unit 151 according to a touch signal input in the first area, and may display an enlargement screen of an image displayed in a second area on the display unit 151 according to a touch signal input in the second area.

Figure 10:
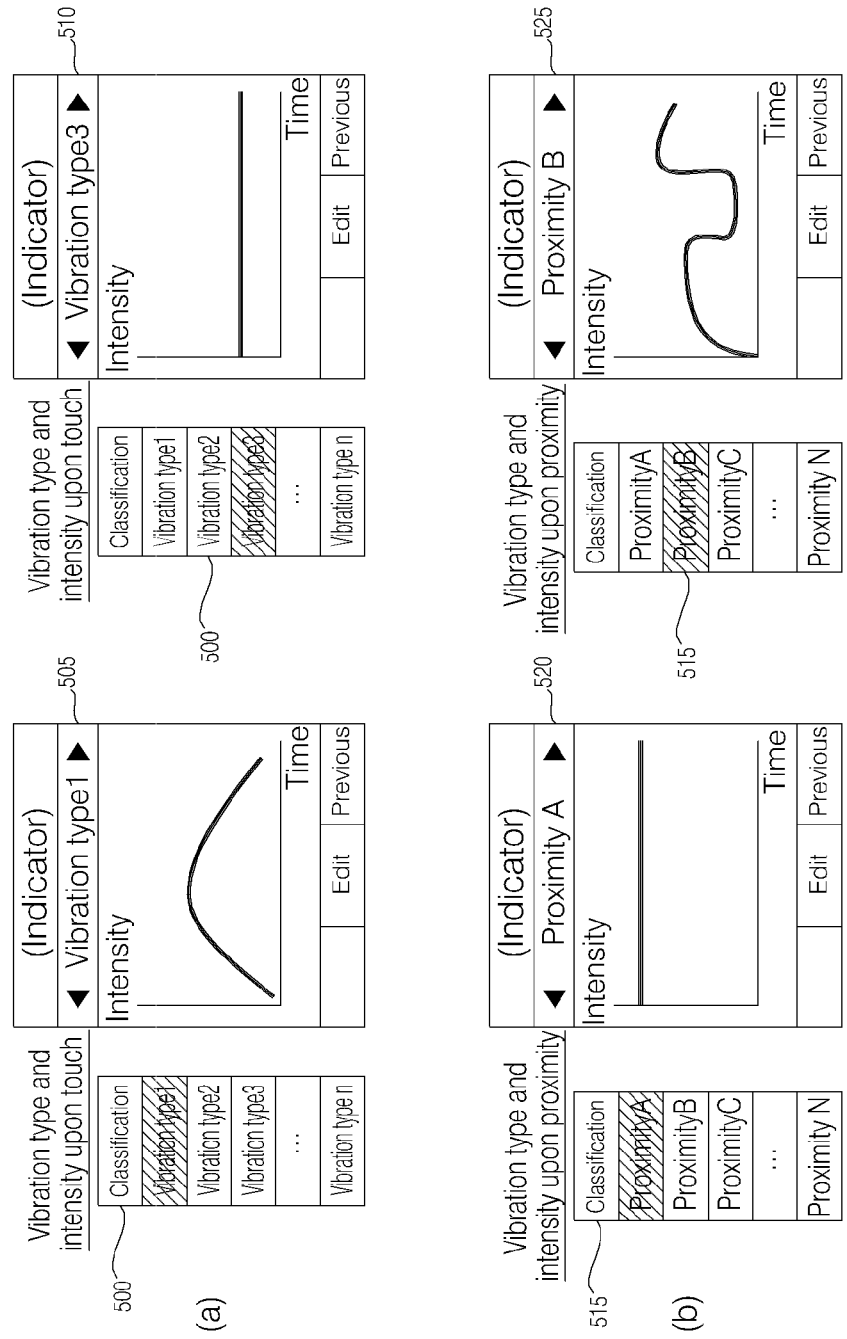
FIGS. 10 and 11 are diagrams showing vibration signals outputted by the mobile terminal, in accordance with one or more embodiments.
Figure 11:
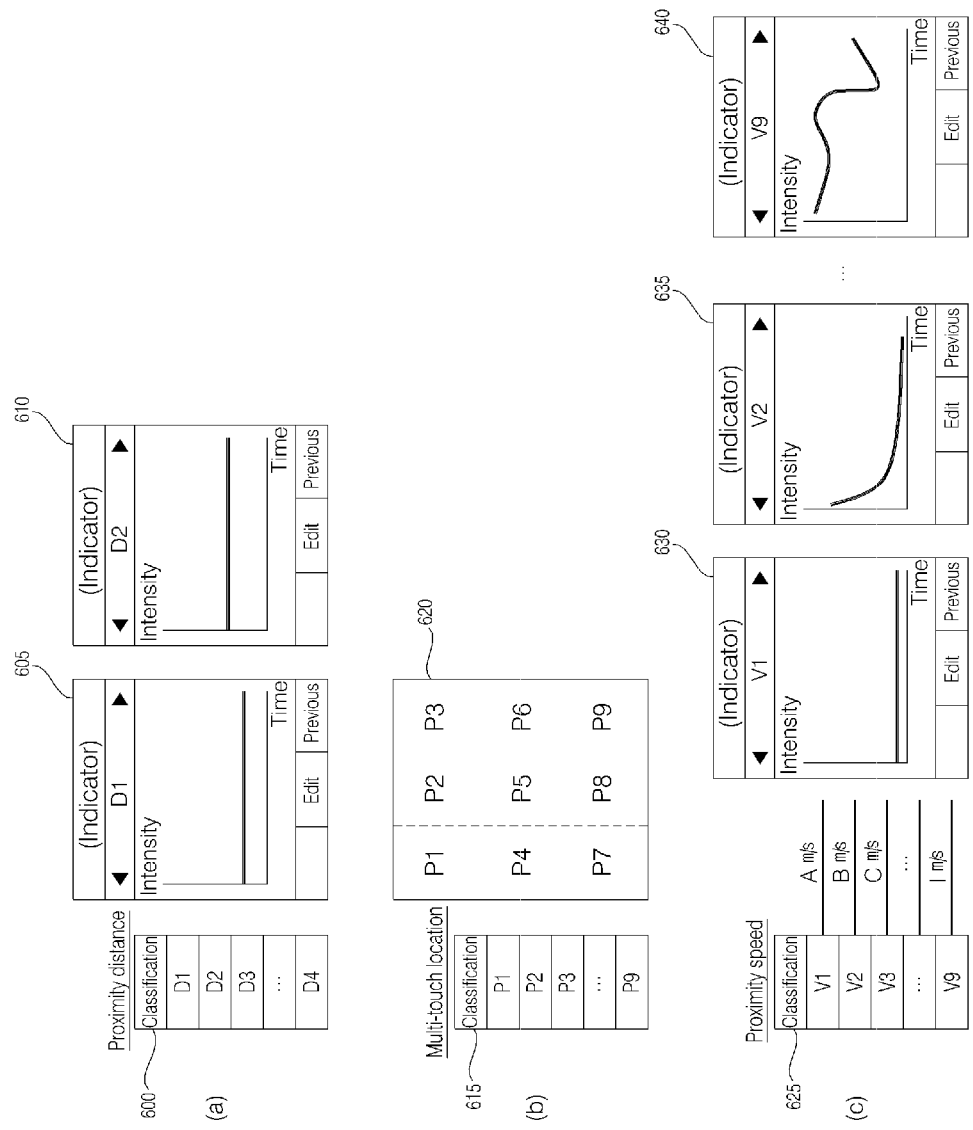

FIGS. 10 and 11 are diagrams showing vibration signals outputted by the mobile terminal 100, in accordance with one or more embodiments.

As shown in (a) of FIG. 10, there appear a screen 505, displaying a vibration signal with respect to vibration type1, which may be selected when a touch signal is input, and a screen 510 displaying a vibration signal with respect to vibration type3. In other words, one of vibration signals with respect to vibration type1 to vibration type n may be set as a vibration signal with respect to an input touch signal according to classification 500 of a vibration type. Here, the pressure and area of an input touch signal and whether the touch signal has been input through multi-touch are not taken into consideration. Further, a vibration signal newly generated by a user may be selected.

As shown in (b) of FIG. 10, there appear a screen 520, displaying a vibration signal in the case of proximity A, which may be selected when a proximity signal is input, and a screen 525 displaying a vibration signal in the case of proximity B. In other words, one of vibration signals with respect to proximity A to proximity N may be set as a vibration signal with respect to an input proximity signal according to vibration type classification 515 of the proximity signal. Here, a proximity speed, a proximity area, and a proximity distance of an input proximity signal, and whether the proximity signal has been input through multi-touch are not taken into consideration.

In the case in which a proximity distance of a proximity signal is considered, there appear a screen 605, displaying a vibration signal with respect to a proximity distance D1, and a screen 610 displaying a vibration signal with respect to a proximity distance D2 as shown in (a) of FIG. 11. In other words, vibration signals with respect to proximity distances D1 to D4 are set as vibration signals with respect to the respective proximity distances according to classification 600 of the proximity distances. Here, the classification 600 with respect to the proximity distances D1 to D4 may be set automatically or set by a user. For example, the proximity distance D1 may be set to 0 to 10 millimeters, and the proximity distance D2 may be set to 10 to 20 millimeters. Alternatively, the proximity distance D1 may be set to 0 to 20 millimeters, and the proximity distance D2 may be set to 20 to 40 millimeters.

In the case in which multi-touch of a proximity signal is taken into consideration, there appears a screen 620, displaying an area in which a proximity signal is input in the display unit 151, that is, a multi-touch area is divided into plural areas, as shown in (b) of FIG. 11. Since an area in which a proximity signal is input into plural areas, an area in which a proximity signal may be input in the display unit 151 is divided into plural areas.

In other words, vibration signals with respect to multi-touch areas P1 to P9 are set as vibration signals with respect to the respective multi-touch areas according to classification 615 of multi-touch. Here, the classification 615 with respect to the multi-touch areas P1 to P9 may be set automatically or set by a user. For example, the multi-touch areas P1 to P9 may be set by dividing an area in which a proximity signal is input into nine equal areas or may be set by randomly dividing the area.

In the case in which a proximity speed of a proximity signal is taken into consideration, there appear a screen 630 displaying a vibration signal with respect to a proximity speed V1, a screen 635 displaying a vibration signal with respect to a proximity speed V2, and a screen 640 displaying a vibration signal with respect to a proximity speed V3, as shown in (c) of FIG. 11.

That is, vibration signals with respect to proximity speeds V1 to V9 are set as vibration signals with respect to the respective proximity speeds according to classification 625 of the proximity speeds. Here, the classification 625 with respect to the proximity speeds V1 to V9 may be set automatically or set by a user. For example, the proximity speed V1 may be set to 0 to 10 cm/s and the proximity speed V2 may be set to 10 to 20 cm/s. Alternatively, the proximity speed V1 may be set to 0 to 20 cm/s, and the proximity speed V2 may be set to 20 to 40 cm/s.

Figure 12:
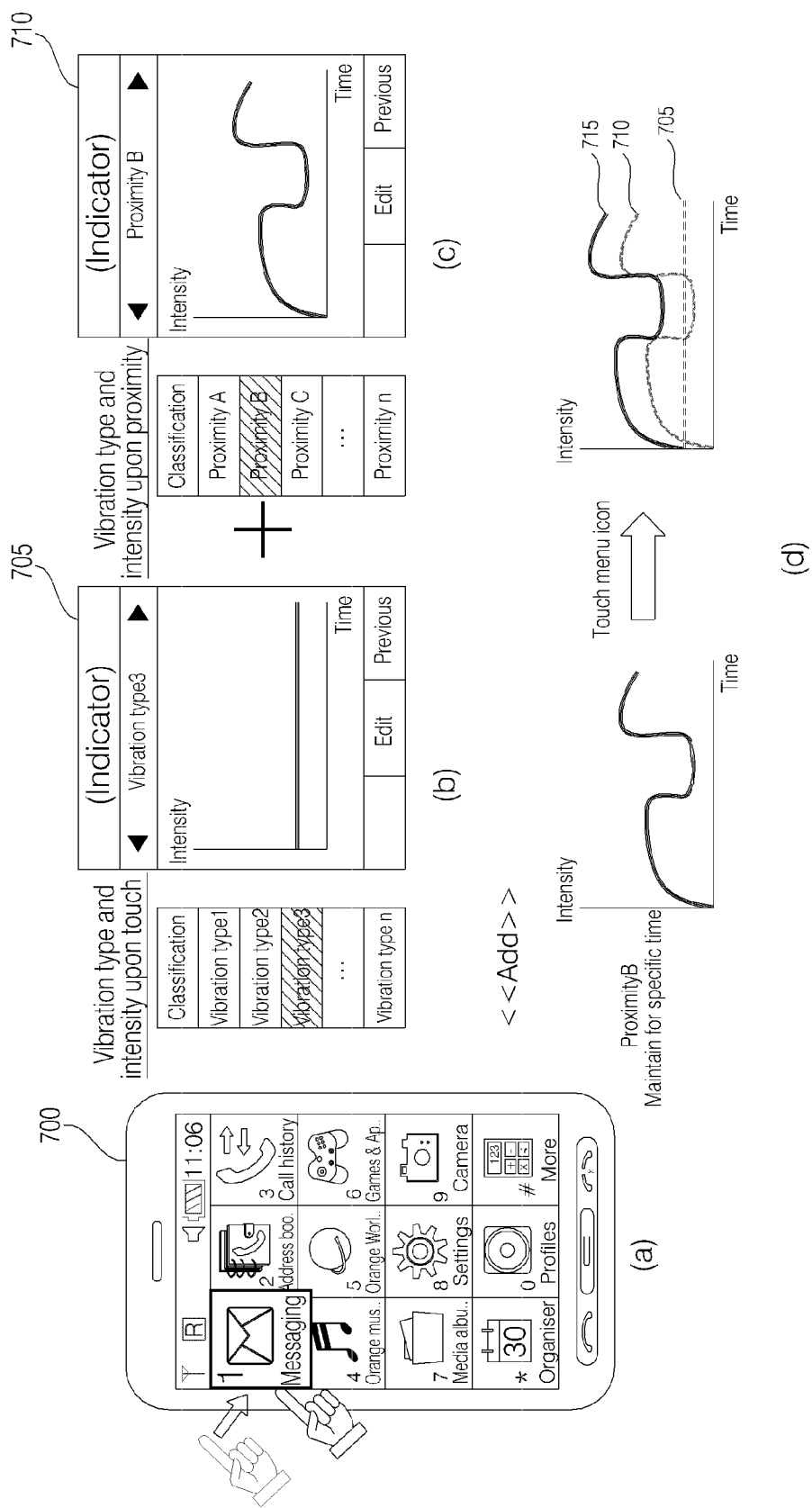
FIGS. 12 and 13 are diagrams showing vibration signals outputted by the mobile terminal, in accordance with one or more embodiments.
Figure 13:
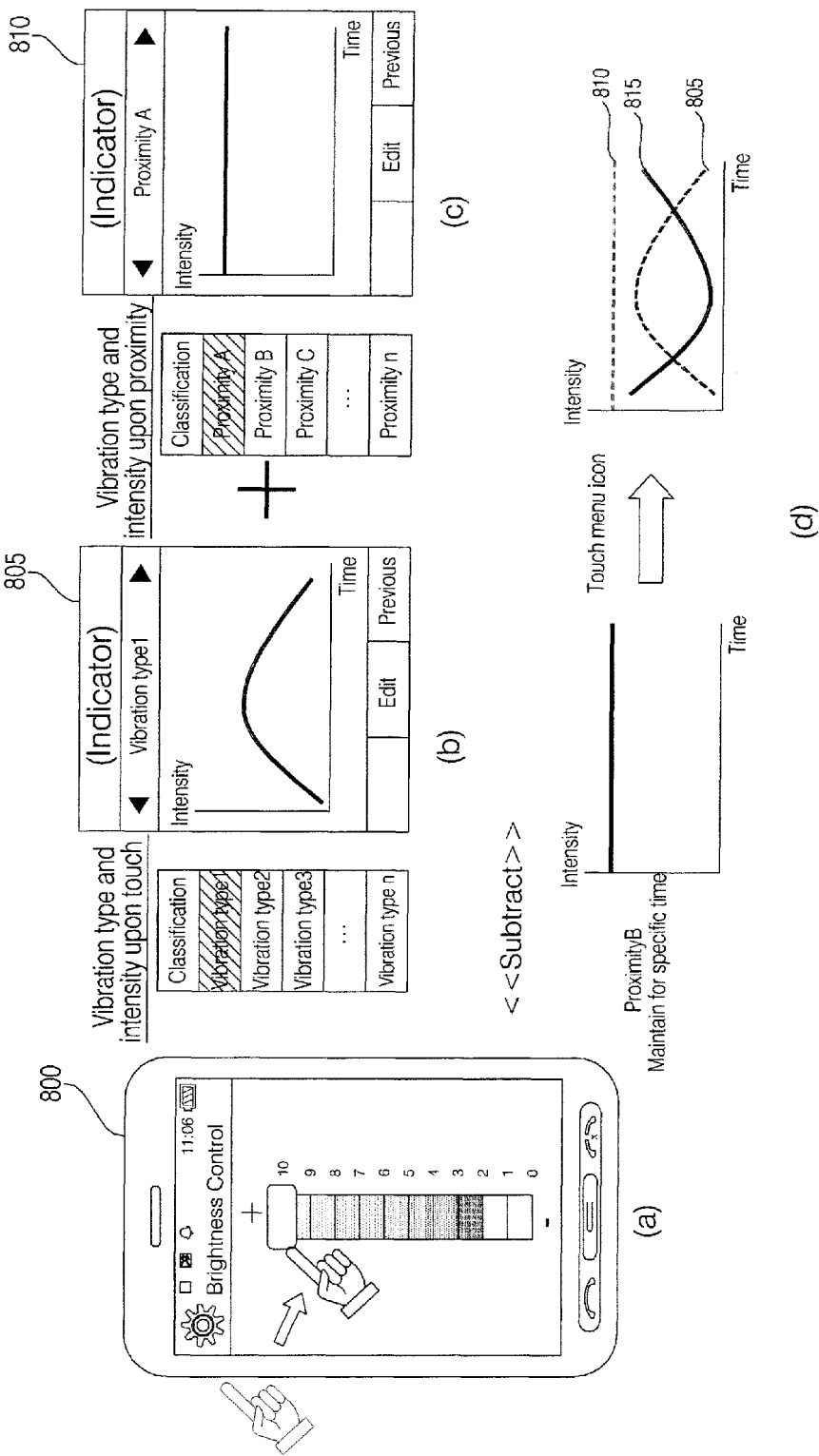

FIGS. 12 and 13 are diagrams showing vibration signals outputted by the mobile terminal 100, in accordance with one or more embodiments. As shown in (a) of FIG. 12, there appears a screen 700 displaying a plurality of menu icons for menu selection. In the case in which a signal for selecting a menu is input, the controller 180 analyzes the input signal. As a result of the analysis, the input signal may have a type, which includes a proximity signal and a touch signal and in which after the proximity signal is detected, the touch signal is input.

A vibration signal set with respect to the touch signal is a vibration signal 705 with respect to vibration type3, as shown in (b) of FIG. 12, and a vibration signal set with respect to the proximity signal is a vibration signal 710 with respect to proximity B, as shown in (c) of FIG. 12.

Accordingly, in the case in which, after the proximity signal is maintained for a specific period of time, a menu icon is touched, vibration 715 in which the vibration signal 705 with respect to the vibration type3 and the vibration signal 710 with respect to the proximity B have been added is output, as shown in (d) of FIG. 12. Here, the vibration may be output by subtracting the respective vibration signals, and a combination method of the vibration signals may be set automatically or set by a user.

As shown in (a) of FIG. 13, there is displayed a screen 800, displaying a brightness control menu for controlling the brightness of the display unit 151. When a signal for selecting brightness is input, the controller 180 analyzes the input signal. As a result of the analysis, the input signal may have a type which includes a proximity signal and a touch signal and in which, after the proximity signal is detected, the touch signal is input.

A vibration signal set with respect to the touch signal is a vibration signal 805 regarding vibration type1 as shown in (b) of FIG. 13, and a vibration signal set with respect to the proximity signal is a vibration signal 810 regarding proximity A as shown in (c) of FIG. 13. Accordingly, in the case in which the proximity signal is maintained for a specific period of time and a menu icon is then touched, vibration 815 in which the vibration signal 805 regarding the vibration type1 has been subtracted from the vibration signal 810 regarding the proximity A is output as shown in (d) of FIG. 13.

Figure 14:
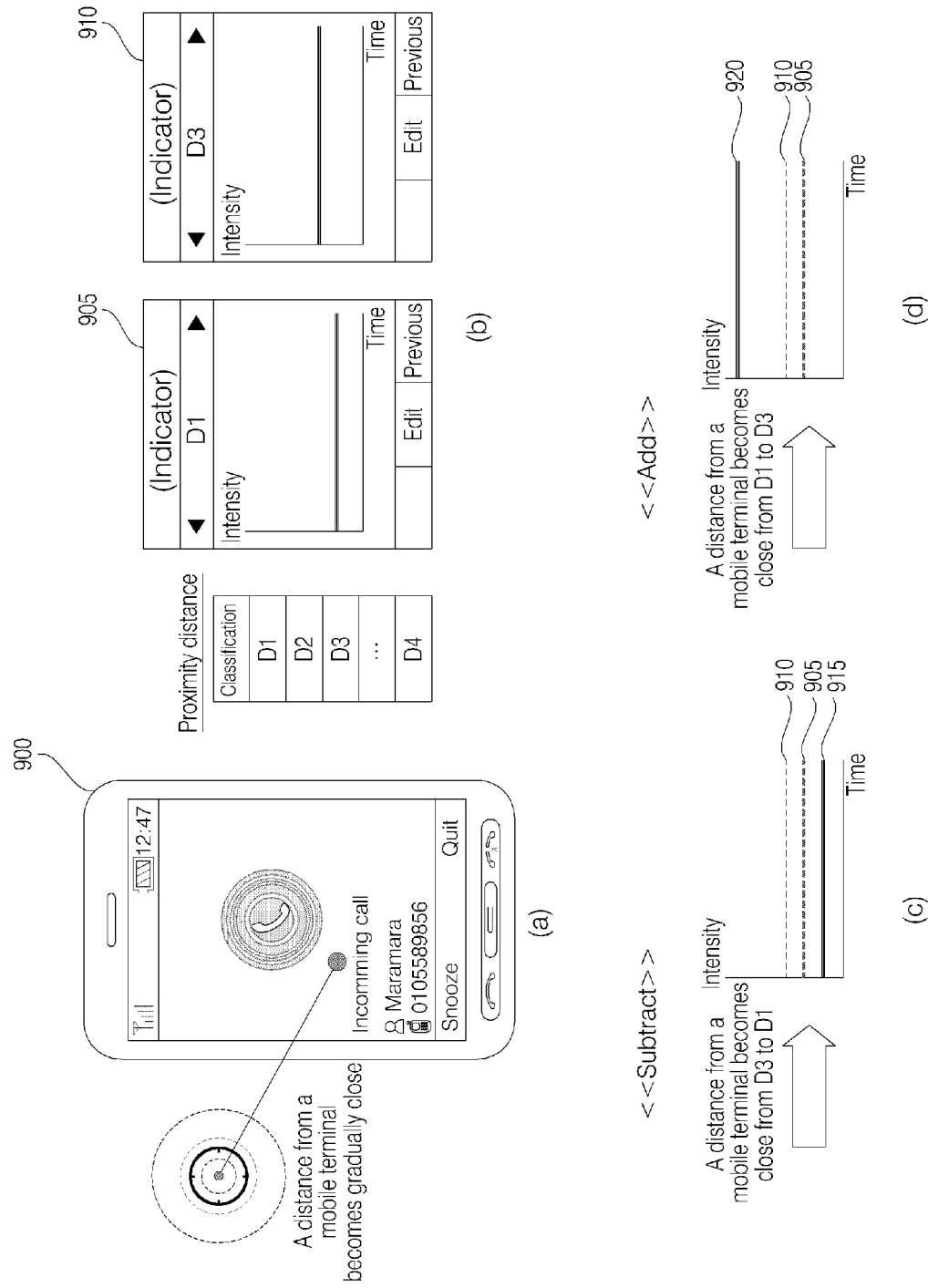

FIGS. 14 and 15 are diagrams showing vibration signals outputted by the mobile terminal 100, in accordance with one or more embodiments. As shown in (a) of FIG. 14, in the case in which a user's hands, ear or face becomes gradually close to or distant from a screen 900 displayed on the display unit 151, the proximity sensor 141 detects a proximity signal, and the controller 180 analyzes the detected proximity signal.

As a result of the analysis, the input signal includes a proximity signal input at a proximity distance D1 and a proximity signal input at a proximity distance D3. As shown in (b) of FIG. 14, a vibration signal 905 with respect to the proximity distance D1 and a vibration signal 910 with respect to the proximity distance D3 are set. In the case in which a distance from the screen 900 is changed from the proximity distance D3 to the proximity distance D1, vibration 910 in which the vibration signal 905 with respect to the proximity distance D1 has been subtracted the vibration signal 910 with respect to the proximity distance D3 is output, as shown in (c) of FIG. 14.

Meanwhile, in the case in which a distance from the screen 900 is changed from the proximity distance D1 to the proximity distance D3, vibration 920 in which the vibration signal 910 with respect to the proximity distance D3 and the vibration signal 905 with respect to the proximity distance D1 have been added is output, as shown in (d) of FIG. 14. A combination method of adding or subtracting the vibration signals may be exchanged.

In (a) of FIG. 15, a signal, including a proximity signal input at a first proximity distance and a proximity signal input at a second proximity distance, is input and a vibration signal is output by combining vibration signals with respect to the respective proximity distances, when an operation button is selected through the display unit 151 to play music.

Since a vibration signal is output separate from audio output, the a user may determine that the operation button has been entered correctly through the vibration signal without being hindered by the music play. The same applies to motion image play, as shown in (b) of FIG. 15. A user may check that that the operation button has been entered correctly through the vibration signal without being hindered by the motion image play.

Figure 17:
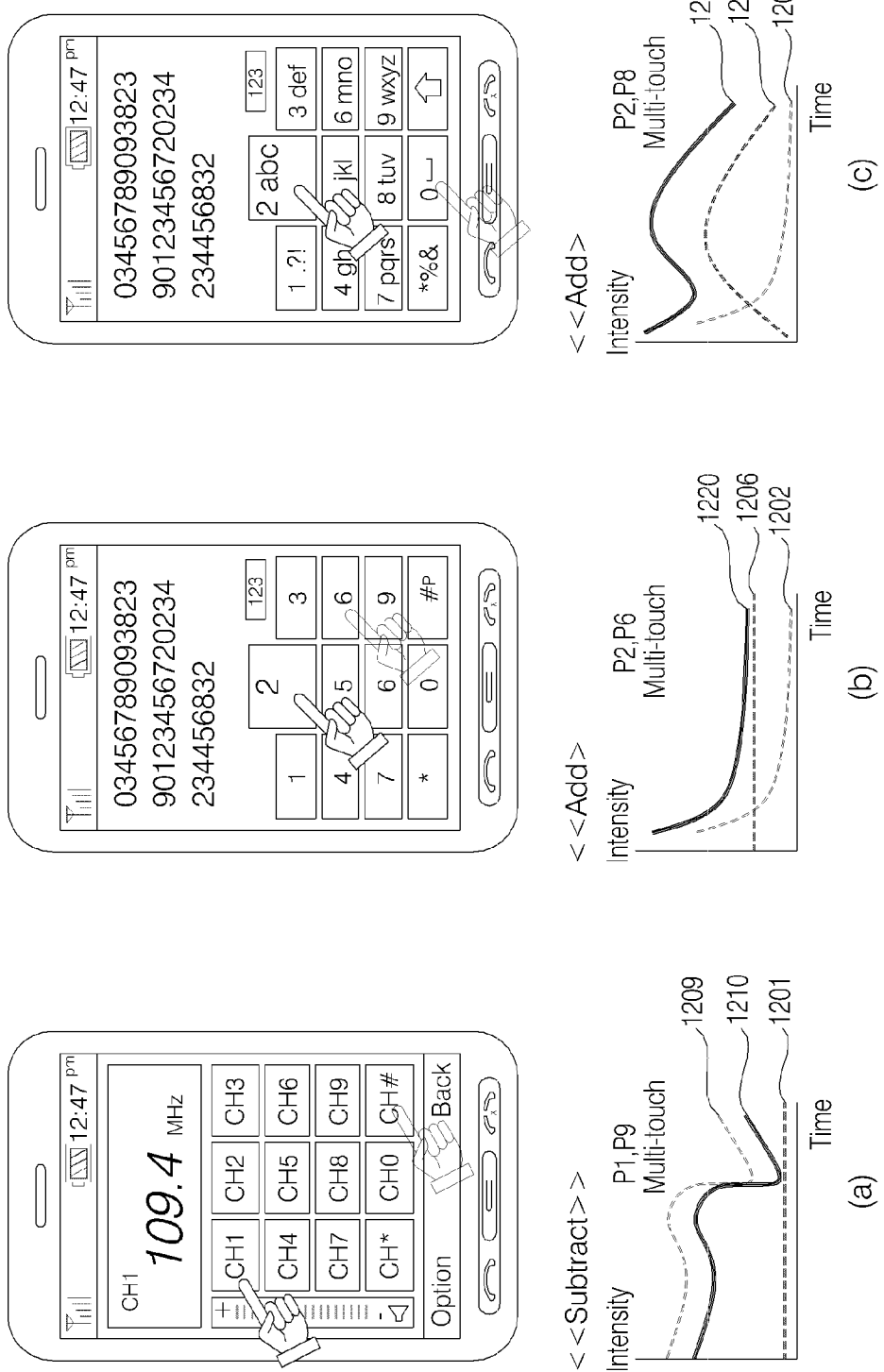

FIGS. 16 to 18 are diagrams showing vibration signals outputted by the mobile terminal 100, in accordance with one or more embodiments. As shown in (a) of FIG. 16, in the case in which a touch signal is input as a multi-touch signal through several areas on a screen 1100 displaying an image, the controller 180 analyzes the input touch signal.

As a result of the analysis, the input signal includes a touch signal input through an area P1 of the multi-touch area and a touch signal input through an area P9 of the multi-touch area. As shown in (b) of FIG. 16, a vibration signal 1105 with respect to the multi-touch area P1 and a vibration signal 1110 with respect to the multi-touch area P9 are set. Accordingly, as shown in (c) of FIG. 16, vibration 1115 in which the vibration signal 1105 with respect to the multi-touch area P1 has been subtracted from the vibration signal 1110 with respect to the multi-touch area P9 is output.

Another embodiment in which a touch signal is input as a multi-touch signal through several areas of a multi-touch area is described with reference to FIGS. 17 and 18.

As shown in (a) of FIG. 17, upon receipt of radio, an area of the display unit 151, displaying twelve operation buttons, may be set as nine multi-touch areas. In the case in which touch signals are input through an area P1 and an area P9 of the nine areas, vibration 1210 in which a vibration signal 1201 with respect to the multi-touch area P1 has been subtracted from a vibration signal 1209 with respect to the multi-touch area P9 is output.

In the case in which an area of the display unit 151, displaying a keypad through which numerals may be input, is set as nine multi-touch areas and touch signals are input through areas P2 and P6, vibration 1220 in which a vibration signal 1202 with respect to the multi-touch area P2 and a vibration signal 1206 with respect to the multi-touch area P6 have been added is output, as shown in (b) of FIG. 17. In the case in which an area of the display unit 151, displaying a keypad through which numerals and text may be input, is set as nine multi-touch areas and touch signals are input through areas P2 and P8, vibration 1230 in which a vibration signal 1202 with respect to the multi-touch area P2 and a vibration signal 1206 with respect to the multi-touch area P8 have been added is output, as shown in (c) of FIG. 17.

Meanwhile, in the case in which the touch signal as shown in (c) of FIG. 17 is input right after the touch signal as shown in (b) of FIG. 17, it corresponds to a case where a distance between the areas in which the touch signals have been input is changed. Accordingly, vibration in which the vibration 1220 shown in (b) of FIG. 17 and the vibration 1230 shown in (c) of FIG. 17 are combined may be output. Further, in the case in which, after the touch signal as shown in (b) of FIG. 17 is input, the touch signal as shown in (c) of FIG. 17 is input, different vibrations may be output according to a speed of the input touch signal.

As shown in (a) of FIG. 18, in the case in which an area of the display unit 151 on which an image list indicated by thumbnail is displayed is set as nine multi-touch areas and touch signals are input through an area P1 and an area P9, vibration 1240 in which a vibration signal 1201 with respect to the multi-touch area P1 has been subtracted from a vibration signal 1209 with respect to the multi-touch area P9 is output.

In the case in which an area of the display unit 151 on which a plurality of menus is displayed is set as nine multi-touch areas and touch signals are input through an area P1 and an area P9, vibration 1250 in which a vibration signal 1209 with respect to the multi-touch area P9 and a vibration signal 1201 with respect to the multi-touch area P1 have been added is output, as shown in (b) of FIG. 18.

In the case in which an area of the display unit 151 on which at least thirty date menus are displayed is set as nine multi-touch areas and touch signals are input through an area P2 and an area P8, vibration 1260 in which a vibration signal 1202 with respect to the multi-touch area P2 and a vibration signal 1208 with respect to the multi-touch area P8 have been added is output, as shown in (c) of FIG. 18.

That is, in the case in which a plurality of menu icons is displayed in a specific area of the display unit 151, a multi-touch area may be set in the specific area of the display unit 151, and the number of the multi-touch areas may be decided independently from the number of a plurality of menu icons. Accordingly, even though different menu icons are multi-touched, the same vibration signal may be output.

FIGS. 19 to 22 are diagrams to which reference is made to illustrate a method of distinguishing input signals received by the mobile terminal 100, in accordance with one or more embodiments.

Figure 19:
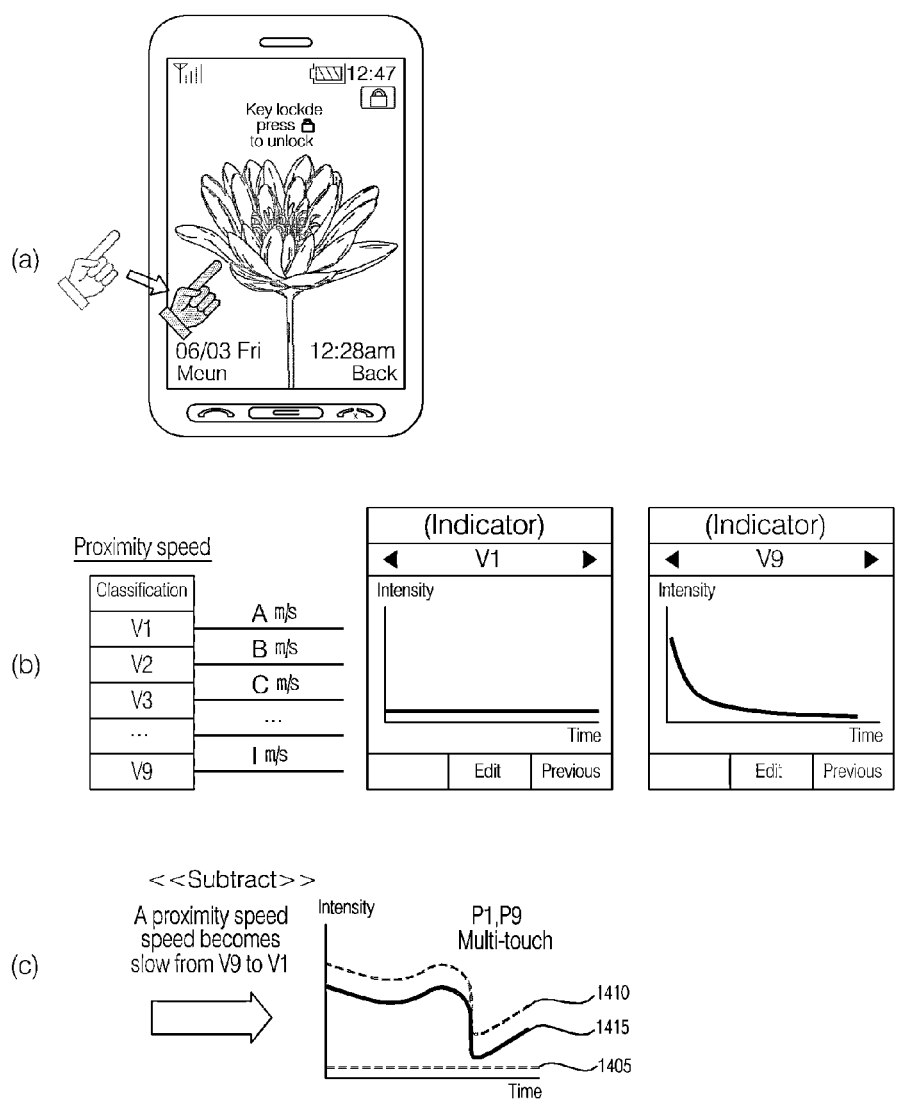
FIGS. 19 to 22 are diagrams to which reference is made to illustrate a method of distinguishing signals received by the mobile terminal, in accordance with one or more embodiments.

As shown in (a) of FIG. 19, in the case in which a user's hands, ear or face becomes gradually close to or distant from a screen 1400 of the display unit 151 at a different speed, the proximity sensor 141 detects a proximity signal and the controller 180 analyzes the detected proximity signal. As a result of the analysis, an input signal includes a proximity signal input at a proximity speed V1 and a proximity signal input at a proximity speed V9.

As shown in (b) of FIG. 19, a vibration signal 1405 with respect to the proximity speed V1 and a vibration signal 1410 with respect to the proximity speed V9 are set. Accordingly, in the case in which the proximity speed of the proximity signal is changed from the proximity speed V9 to the proximity speed V1, vibration 1415 in which the vibration signal 1405 with respect to the proximity speed V1 has been subtracted from the vibration signal 1410 with respect to the proximity speed V9 is output, as shown in (c) of FIG. 19.

Another embodiment in which proximity signals with different speeds are detected is described below with reference to FIG. 20. In the case in which a proximity speed of a proximity signal with respect to a menu button for multi-tasking is changed from a proximity speed V9 to a proximity speed V1, vibration 1510 in which a vibration signal 1501 with respect to the proximity speed V1 has been subtracted from a vibration signal 1509 with respect to the proximity speed V9 is output, as shown in (a) of FIG. 20.

Figure 20:
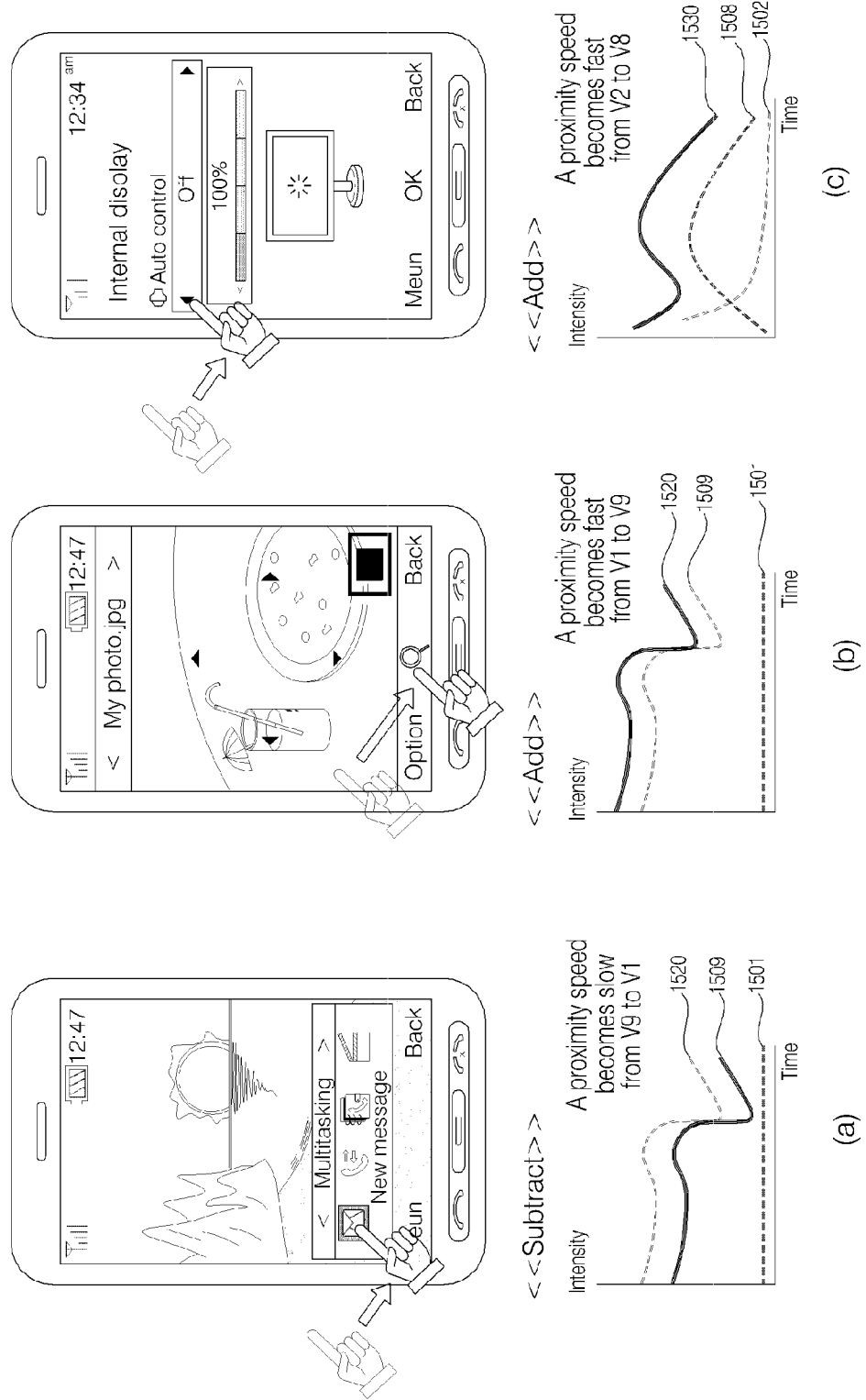

In the case in which a proximity speed of a proximity signal with respect to a menu button for multi-tasking for image enlargement is changed from a proximity speed V1 to a proximity speed V9, vibration 1520 in which the vibration signal 1509 with respect to the proximity speed V9 and the vibration signal 1501 with respect to the proximity speed V1 have been added is output, as shown in (b) of FIG. 20. In the case in which a proximity speed of a proximity signal with respect to a menu button for setting environments of the display unit 151 is changed from a proximity speed V2 to a proximity speed V8, vibration 1530 in which a vibration signal 1508 with respect to the proximity speed V8 and a vibration signal 1502 with respect to the proximity speed V2 have been added is output, as shown in (c) of FIG. 20.

Figure 21:
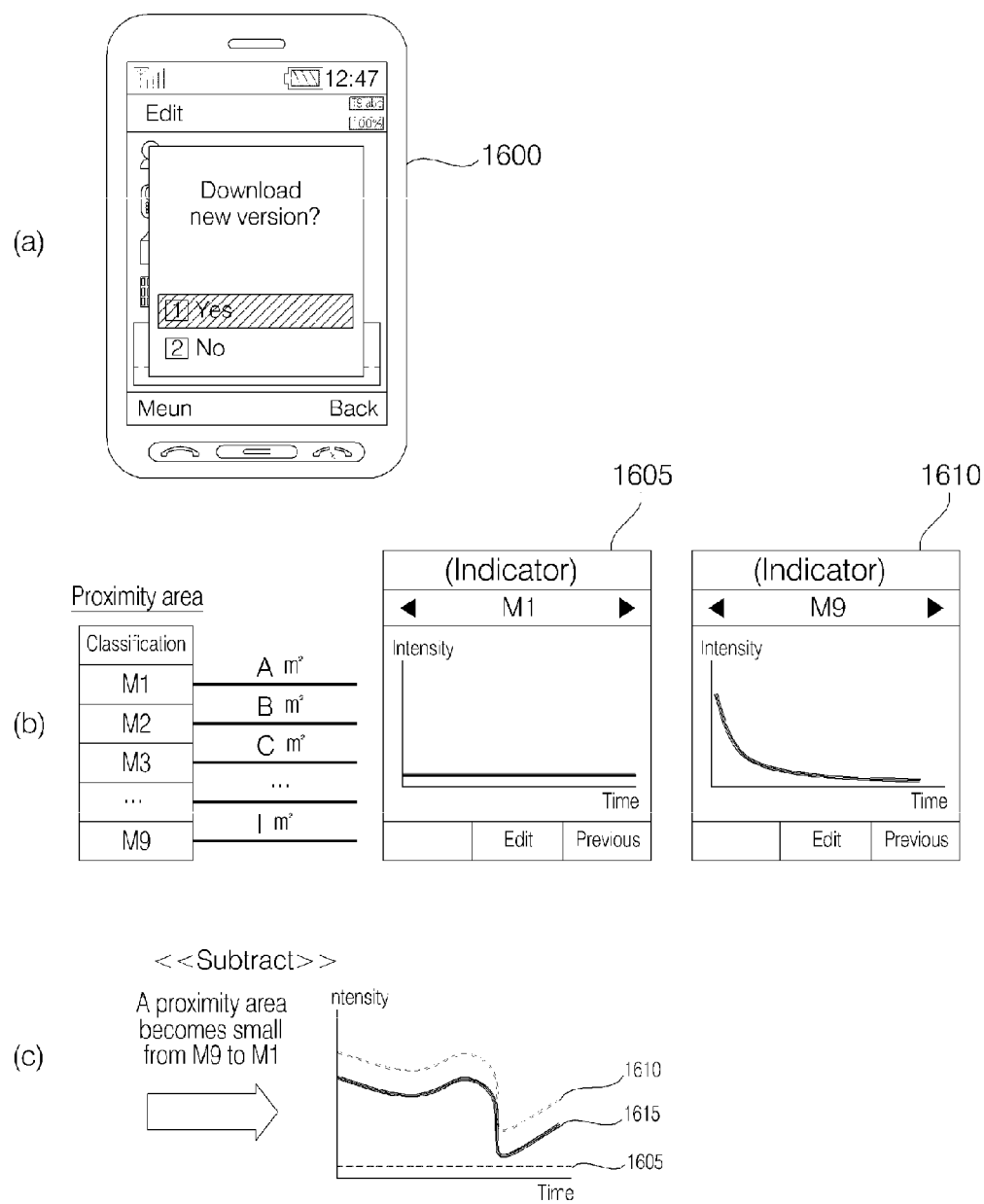

Meanwhile, in the case in which a signal for selection is input in a screen 1600 on which menu buttons are displayed as shown in (a) of FIG. 21, the controller 180 analyzes an input signal. As a result of the analysis, the input signal includes a proximity signal input through a proximity area M9 and a proximity signal input through a proximity area M1.

As shown in (b) of FIG. 21, a vibration signal 1610 with respect to the proximity area M9 and a vibration signal 1605 with respect to the proximity area M1 are set. In the case in which a proximity area of an input proximity signal is changed from the proximity area M9 to the proximity area M1, vibration 1615 in which the vibration signal 1605 with respect to the proximity area M1 has been subtracted from the vibration signal 1610 with respect to the proximity area M9 is output, as shown in (c) of FIG. 21.

As still another embodiment in which proximity signals with different proximity areas are detected is described below with reference to FIG. 22. As shown in (a) of FIG. 22, in the case in which a proximity area of a proximity signal is changed from a proximity area M9 to a proximity area M1 in a menu button for playing motion images, vibration 1710 in which a vibration signal 1701 with respect to the proximity area M1 has been subtracted from a vibration signal 1709 with respect to the proximity area M9 is output.

Figure 22:
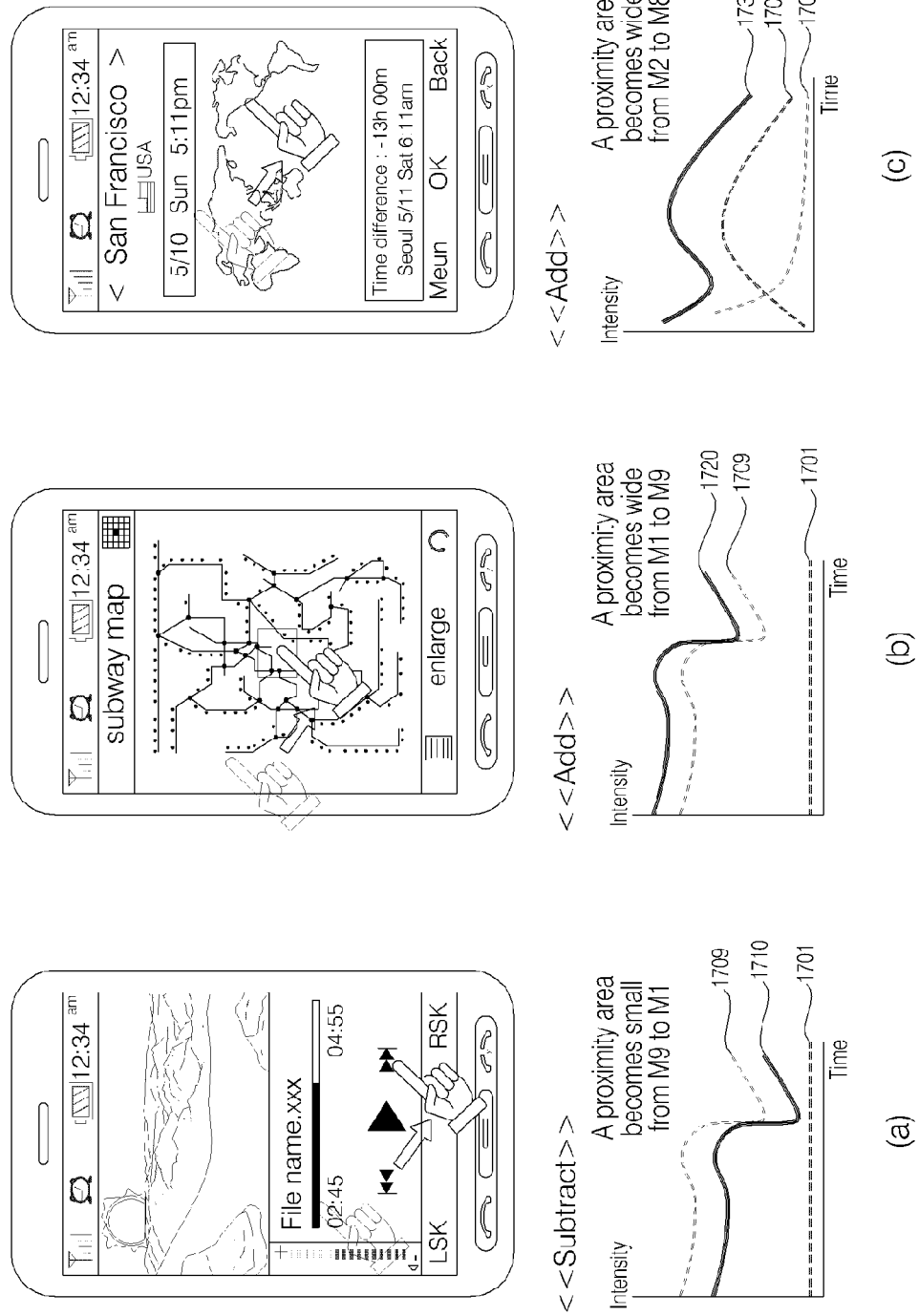

In the case in which a proximity area of a proximity signal is changed from a proximity area M1 to a proximity area M9 in a menu button for enlarging images, vibration 1720 in which a vibration signal 1709 with respect to the proximity area M9 and a vibration signal 1701 with respect to the proximity area M1 have been added is output, as shown in (b) of FIG. 22.

In the case in which a proximity area of a proximity signal with respect to a menu button for the worldwide time is changed from M2 to M8, vibration 1730 in which a vibration signal 1702 with respect to the proximity area M2 and a vibration signal 1708 with respect to the proximity area M8 have been added is output, as shown in (c) of FIG. 22.

In an alternative embodiment, the invention may be implemented as computer program product accessible from a computer-usable or computer-readable medium providing program code for use by or in connection with a computer or any instruction execution system. For the purposes of this description, a computer-usable or computer-readable medium may be any apparatus that can contain, store, communicate, propagate or transport the program for use by or in connection with the instruction execution system, apparatus or device.

The computer-readable medium may be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk read only memory (CD-ROM), compact disk read/write (CD-R/W) and digital video disk (DVD).

It should also be understood that the logic code, programs, modules, processes, methods and the order in which the respective steps of each method are performed are purely exemplary. Depending on implementation, the steps can be performed in any order or in parallel, unless indicated otherwise in the present disclosure. Further, the logic code is not related, or limited to any particular programming language, and may comprise of one or more modules that execute on one or more processors in a distributed, non-distributed or multi-processing environment.

The present invention has been described above with reference to one or more features or embodiments. Those skilled in the art will recognize, however, that changes and modifications may be made to these embodiments without departing from the scope of the present invention. These and various other adaptations and combinations of the embodiments disclosed are within the scope of the invention and are further defined by the claims and their full scope of equivalents.

What is claimed is:

1. A method of distinguishing input signals detected by a mobile terminal, the method comprising:
   detecting a proximity touch and a touch input received at the mobile terminal, wherein a first vibration is associated with the proximity touch and a second vibration is associated with the touch input;
   determining a first location on a touch screen of the mobile terminal at which the proximity touch is received and a second location on the touch screen at which the touch input is received;
   outputting at least the first vibration or the second vibration in response to determining that the first and second locations are different; and
   outputting a third vibration that is a combination of the first vibration and the second vibration via a haptic module of the mobile terminal, in response to determining that the first location and the second location are the same,
   wherein:
   the proximity touch is detected prior to the detection of the touch input;
   the third vibration results from an addition or subtraction of signals respectively corresponding to the first vibration and the second vibration;
   the third vibration is not output when the determined first location and second location are not the same; and
   the first vibration, the second vibration, and the third vibration are different from each other.

2. The method of claim 1, further comprising displaying an execution screen corresponding to the first location, in response to determining that the first and second locations are the same.

3. The method of claim 1, further comprising outputting the first vibration regardless of whether the first location and the second location are the same.

4. A method of distinguishing proximity input signals detected by a proximity sensor of a mobile terminal, the method comprising:
   detecting a first proximity input at a first proximity distance from the proximity sensor and a second proximity input at a second proximity distance from the proximity sensor, wherein a first vibration is associated with the first proximity input and a second vibration is associated with the second proximity input;

outputting the first vibration in response to detecting the first proximity input; and outputting a third vibration that is a combination of the first vibration and the second vibration via a haptic module of the mobile terminal when the first proximity input and the second proximity input are detected substantially simultaneously or sequentially, wherein:

the third vibration results from an addition or subtraction of signals respectively corresponding to the first vibration and the second vibration;

the third vibration is not output when the first proximity input and the second proximity input are not detected substantially simultaneously or sequentially; and the first vibration, the second vibration, and the third vibration are different from each other.

5. The method of claim 4, wherein the first vibration is output regardless of whether the second proximity input is detected.

6. A method of distinguishing touch input signals detected by a touch screen of a mobile terminal, the method comprising:

detecting a first touch input received at a first area of the touch screen and a second touch input received at a second area of the touch screen, wherein a first vibration is associated with the first touch input and a second vibration is associated with the second touch input; and outputting a third vibration that is a combination of the first vibration and the second vibration via a haptic module of the mobile terminal in response to detecting the first touch input and the second touch input substantially simultaneously or sequentially, wherein:

the third vibration results from an addition or subtraction of signals respectively corresponding to the first vibration and the second vibration;

the third vibration is not output when the first touch input and the second touch input are not detected substantially simultaneously or sequentially; and the first vibration, the second vibration, and the third vibration are different from each other.

7. The method of claim 6, wherein the third vibration is outputted according to a distance between the first area and the second area.

8. The method of claim 6, further comprising detecting a third touch input received at a third area of the touch screen and a fourth touch input received at a fourth area of the touch screen, wherein the third vibration is outputted according to a change in a distance between the first and second areas and a distance between the third and fourth areas.

9. The method of claim 6, further comprising detecting a third touch input received at a third area of the touch screen and a fourth touch input received at a fourth area of the touch screen, wherein the third vibration is outputted according to a speed difference between the first touch input and the second touch input received at the first and second areas and the third touch input and the fourth touch input received at the third and fourth areas.

10. The method of claim 6, further comprising outputting a first alarm vibration, in response to determining that the first touch input and the second touch input enlarge or maximize an image displayed on the touch screen.

11. The method of claim 6, further comprising outputting a second alarm vibration in response to determining that the first touch input and the second touch input reduce or minimize an image displayed on the touch screen.

12. The method of claim 6, further comprising determining whether a distance between the first area and the second area is less or greater than a threshold distance such that the third vibration is output differently depending on whether the distance between the first area and the second area is less or greater than the threshold distance.

13. A method of distinguishing input signals detected by a mobile terminal, the method comprising:

detecting at least a first input and a second input, wherein a first vibration is associated with the first input and a second vibration is associated with the second input;

outputting the first vibration in response to detecting the first input or outputting the second vibration in response to detecting the second input; and outputting a third vibration that is a combination of the first vibration and the second vibration via a haptic module of the mobile terminal in response to detecting the at least first input and second input substantially simultaneously or sequentially, wherein:

the third vibration results from an addition or subtraction of signals respectively corresponding to the first vibration and the second vibration;

the third vibration is not output when the at least first input and second input are not detected substantially simultaneously or sequentially; and the first vibration, the second vibration, and the third vibration are different from each other.

14. The method of claim 13, wherein the first input and the second input are proximity inputs detected by a proximity sensor of the mobile terminal.

15. The method of claim 14, wherein the proximity inputs are detected at different proximity speeds.

16. The method of claim 14, wherein the proximity inputs are detected at different proximity areas.

17. The method of claim 14, wherein the proximity inputs are detected at different locations.

18. The method of claim 14, wherein the first input and the second input are touch inputs received at a touch screen of the mobile terminal.

19. The method of claim 18, wherein the touch inputs are inputted at different areas of the touch screen.

20. The method of claim 18, wherein the touch inputs are received with different pressures at the touch screen.

21. A mobile terminal comprising:

a proximity sensor for detecting a proximity touch and a touch input received at the mobile terminal, wherein a first vibration is associated with the proximity touch;

a touch screen for detecting the touch input, wherein a second vibration is associated with the touch input;

a controller for determining a first location of the touch screen at which the proximity touch is received and a second location of the touch screen at which the touch input is received; and a haptic module for:

outputting at least the first vibration or the second vibration in response to determining that the first and second locations are different; and outputting a third vibration that is a combination of the first vibration and the second vibration in response to determining that the first location and the second location are the same, wherein:

the proximity touch is detected prior to the detection of the touch input;

the third vibration results from an addition or subtraction of signals respectively corresponding to the first vibration and the second vibration;

the third vibration is not output when the determined first location and second location are not the same; and the first vibration, the second vibration, and the third vibration are different from each other.

22. The mobile terminal of claim 21, wherein the controller is further for causing displaying of an execution screen corresponding to the first location, in response to determining that the first and second locations are the same.

23. The mobile terminal of claim 21, wherein the first vibration is output regardless of whether the first location and the second location are the same.

24. A mobile terminal comprising:
a proximity sensor for detecting a first proximity input at a first proximity distance from the proximity sensor and a second proximity input at a second proximity distance from the proximity sensor, wherein a first vibration is associated with the first proximity input and a second vibration is associated with the second proximity input; and
a haptic module for:
outputting the first vibration in response to detecting the first proximity input; and
outputting a third vibration that is a combination of the first vibration and the second vibration when the first proximity input and the second proximity input are detected substantially simultaneously or sequentially,
wherein:
the third vibration results from an addition or subtraction of signals respectively corresponding to the first vibration and the second vibration;
the third vibration is not output when the first proximity input and the second proximity input are not detected substantially simultaneously or sequentially; and
the first vibration, the second vibration, and the third vibration are different from each other.

25. The mobile terminal of claim 24, wherein the first vibration is output regardless of whether the second proximity input is detected.

26. A mobile terminal comprising:
a touch screen for detecting a first touch input received at a first area of the touch screen and a second touch input received at a second area of the touch screen, wherein a first vibration is associated with the first touch input and a second vibration is associated with the second touch input; and
a haptic module for outputting a third vibration that is a combination of the first vibration and the second vibration in response to detecting the first touch input and the second touch input substantially simultaneously or sequentially,
wherein:
the third vibration results from an addition or subtraction of signals respectively corresponding to the first vibration and the second vibration;
the third vibration is not output when the first touch input and the second touch input are not detected substantially simultaneously or sequentially; and
the first vibration, the second vibration, and the third vibration are different from each other.

27. The mobile terminal of claim 26, wherein the third vibration is outputted according to a distance between the first area and the second area.

28. The mobile terminal of claim 26, wherein the touch screen is further for detecting a third touch input received at a third area of the touch screen and a fourth touch input received at a fourth area of the touch screen, wherein the third vibration is outputted according to a change in a distance between the first and second areas and a distance between the third and fourth areas.

29. The mobile terminal of claim 26, wherein the touch screen is further for detecting a third touch input received at a third area of the touch screen and a fourth touch input received at a fourth area of the touch screen, wherein the third vibration is outputted according to a speed difference between the first touch input and the second touch input received at the first and second areas and the third touch input and the fourth touch input received at the third and fourth areas.

30. The mobile terminal of claim 26, wherein the haptic module is further for outputting a first alarm vibration, in response to determining that the first touch input and the second touch input enlarge or maximize an image displayed on the touch screen.

31. The mobile terminal of claim 26, wherein the haptic module is further for outputting a second alarm vibration in response to determining that the first touch input and the second touch input reduce or minimize an image displayed on the touch screen.

32. The mobile terminal of claim 26, further comprising a controller for determining whether a distance between the first area and the second area is less or greater than a threshold distance such that the third vibration is output differently depending on whether the distance between the first area and the second area is less or greater than the threshold distance.

33. A mobile terminal comprising:
a detection unit for detecting at least a first input and a second input, wherein a first vibration is associated with the first input and a second vibration is associated with the second input; and
a haptic module for:
outputting the first vibration in response to detecting the first input or outputting the second vibration in response to detecting the second input; and
outputting a third vibration that is a combination of the first vibration and the second vibration in response to detecting the at least first input and second input substantially simultaneously or sequentially,
wherein:
the third vibration results from an addition or subtraction of signals respectively corresponding to the first vibration and the second vibration;
the third vibration is not output when the at least first input and second input are not detected substantially simultaneously or sequentially; and
the first vibration, the second vibration, and the third vibration are different from each other.

34. The mobile terminal of claim 33, further comprising a proximity sensor for receiving the first input and the second input as proximity inputs.

35. The mobile terminal of claim 34, wherein the proximity inputs are detected at different proximity speeds.

36. The mobile terminal of claim 34, wherein the proximity inputs are detected at different proximity areas.

37. The mobile terminal of claim 34, wherein the proximity inputs are detected at different locations.

38. The mobile terminal of claim 33, further comprising a touch screen for receiving the first input and the second input as touch inputs.

39. The mobile terminal of claim 38, wherein the touch inputs are received at different areas of the touch screen.

40. The mobile terminal of claim 38, wherein the touch inputs are received with different pressures at the touch screen.

* * * * *